(12) United States Patent
Jeon et al.

(10) Patent No.: US 8,842,640 B2
(45) Date of Patent: Sep. 23, 2014

(54) PRE-CODING METHOD FOR SPATIAL MULTIPLEXING IN MULTIPLE INPUT AND OUTPUT SYSTEM

(75) Inventors: Beom Jin Jeon, Seoul (KR); Joong Heon Kim, Seoul (KR); Alexey Rubtsov, Nizhny Novgorod (RU); Alexander Flaksman, Nizhny Novgorod (RU); Sergey Tiraspolsky, Moscow (RU)

(73) Assignee: LG Electronics Inc., Seoul (KR)

( * ) Notice: Subject to any disclaimer, the term of this patent is extended or adjusted under 35 U.S.C. 154(b) by 218 days.

(21) Appl. No.: 13/127,007

(22) PCT Filed: Nov. 2, 2009

(86) PCT No.: PCT/KR2009/006394
§ 371 (c)(1),
(2), (4) Date: Aug. 1, 2011

(87) PCT Pub. No.: WO2010/062051
PCT Pub. Date: Jun. 3, 2010

(65) Prior Publication Data
US 2011/0280188 A1 Nov. 17, 2011

Related U.S. Application Data

(60) Provisional application No. 61/110,600, filed on Nov. 2, 2008, provisional application No. 61/157,558, filed on Mar. 5, 2009, provisional application No. 61/157,559, filed on Mar. 5, 2009.

(51) Int. Cl.
*H04W 4/00* (2009.01)
*H04B 7/06* (2006.01)
*H04B 7/04* (2006.01)

(52) U.S. Cl.
CPC ............ *H04B 7/0617* (2013.01); *H04B 7/0697* (2013.01); *H04B 7/063* (2013.01); *H04B 7/0417* (2013.01)
USPC .......................................... 370/334; 370/328

(58) Field of Classification Search
CPC ........ H04B 7/413; H04B 7/617; H04B 7/697; H04B 7/063; H04B 7/691
USPC .................................. 370/328, 334
See application file for complete search history.

(56) References Cited

U.S. PATENT DOCUMENTS 7,406,055 B2 7/2008 Taira et al.
2003/0128658 A1 7/2003 Walton et al.
(Continued)

FOREIGN PATENT DOCUMENTS

CN 1502180 A 6/2004
CN 1636346 A 7/2005
(Continued)

OTHER PUBLICATIONS

Interdigital Communications Corporation, "Feedback Methods for Downlink MIMO Pre-Coding for E-UTRA," 3GPP TSG RAN WG1 #47, R1-063467, Agenda Item 6.5.4, Nov. 6-10, 2006, Riga Latvia, 6 pages.

*Primary Examiner* — Omer S Mian
(74) *Attorney, Agent, or Firm* — Birch, Stewart, Kolasch & Birch, LLP

(57) ABSTRACT

The present invention relates to a pre-coding method for spatial multiplexing, comprising the steps of: performing a beam search for beam forming with a receiver device equipped with multiple antennas to perform pre-coding for spatial multiplexing in a transmitter device equipped with multiple antennas; transmitting a first packet including at least one or more training sequences to the receiver device after completion of said beam search; receiving, from the receiver device, a second packet including feedback information for pre-coding, determined in the receiver device by using the training sequences; and performing pre-coding for spatial multiplexing, onto the data stream to be transmitted to the receiver device, by using the pre-coding matrix calculated on the basis of the feedback information.

16 Claims, 19 Drawing Sheets

(56) References Cited

U.S. PATENT DOCUMENTS

| | | |
|---|---|---|
| 2003/0185309 A1 | 10/2003 | Pautler et al. |
| 2006/0023666 A1 | 2/2006 | Jalali et al. |
| 2006/0034163 A1 | 2/2006 | Gore et al. |
| 2007/0097856 A1* | 5/2007 | Wang et al. .................. 370/210 |
| 2007/0189416 A1* | 8/2007 | Kim et al. .................... 375/299 |
| 2008/0080459 A1 | 4/2008 | Kotecha et al. |
| 2009/0046008 A1 | 2/2009 | Murakami et al. |
| 2009/0233545 A1* | 9/2009 | Sutskover et al. ............. 455/25 |
| 2010/0103044 A1 | 4/2010 | Hoshino et al. |
| 2011/0280188 A1 | 11/2011 | Jeon et al. |

FOREIGN PATENT DOCUMENTS

| | | |
|---|---|---|
| JP | 5368573 B2 | 12/2013 |
| KR | 2003-0007481 A | 1/2003 |
| KR | 10-2006-0113755 A | 11/2006 |
| KR | 10-2008-0085382 A | 9/2008 |
| WO | WO 2004/095730 A1 | 11/2004 |
| WO | WO 2006/075453 A1 | 7/2006 |
| WO | WO 2008/126378 A1 | 10/2008 |

\* cited by examiner

FIG. 10
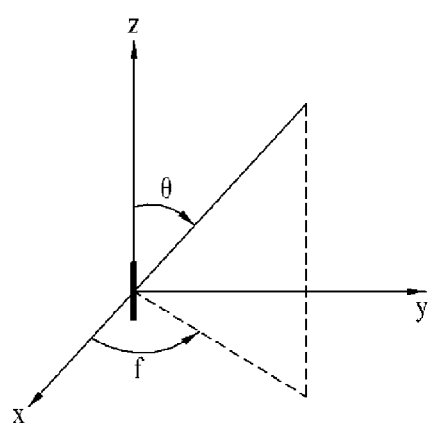 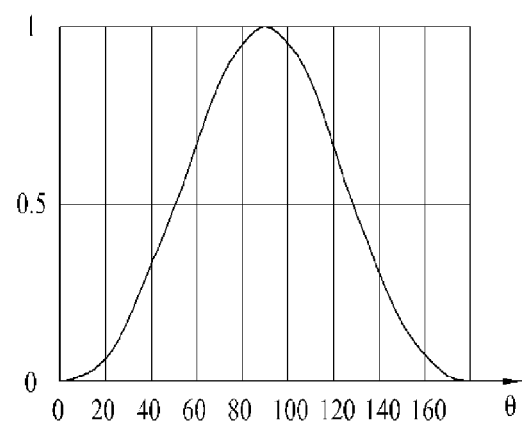
(a) (b)

| the number of bits:16 | 2 | 128 | 6 |
|---|---|---|---|
| Tx device gain selection | reserved field | Tx device AWV feedback information | Tx device AWV index |

| the number of bits :6 | 128 | 6 | 12 |
|---|---|---|---|
| reserved field | Tx device AWV feedback information | Tx device AWV index | cyclic redundancy check code |

| the number of bits :2 | 2 | 3 | n | n | 32 | n |
|---|---|---|---|---|---|---|
| stream number field | port number field | subcarrier order field | receiving strength matrix field | precoding angle field | CRC field | stuff bit field |
| 130 | 131 | 132 | 133 | 134 | 135 | 136 |

PRE-CODING METHOD FOR SPATIAL MULTIPLEXING IN MULTIPLE INPUT AND OUTPUT SYSTEM

This application is a National Phase of PCT/KR2009/006394 filed on Nov. 2, 2009, which claims priority under 35 USC 119(e) to U.S. Provisional Application No. 61/110,600 filed on Nov. 2, 2008 and Application Nos. 61/157,558 and 61/157,559 filed on Mar. 5, 2009, all of which are hereby expressly incorporated by reference into the present application.

TECHNICAL FIELD

The present invention relates to a multiple input and output system, and more particularly, to a precoding method for spatial multiplexing in a multiple input and output system.

BACKGROUND ART

Recently, with the spread of information communication services, the advent of various multimedia services and the advent of advanced services, the needs of wireless communication services have been rapidly increased. In order to actively meet such needs, throughput of a communication system should be enhanced together with reliability in data transmission.

In order to increase communication throughput under the wireless communication condition, a method for newly discovering an available frequency band and a method for enhancing efficiency of given resources may be considered. A multiple input multiple output (MIMO) antenna system based on the latter method has been actively developed, in which a plurality of antennas are provided in a transceiver and a spatial region for resources is additionally provided to obtain diversity gain, and data are transmitted in parallel through each antenna to increase transmission throughput.

DISCLOSURE

Technical Problem

In the aforementioned related art, the present invention is intended to provide a precoding method for spatial multiplexing in a MIMO system.

Generally, in a MIMO system that uses a plurality of antennas, a precoding matrix and a decoding matrix, which are used for precoding or encoding and decoding operation to reduce inter-channel interference, are affected by the number of antennas of the MIMO system. In other words, since dimensions of a matrix used for operation increase as much as the number of antennas, if the number of antennas increases, complexity of the system increases.

Also, if a plurality of antennas used in the MIMO system are split into one or more beamforming antenna groups for application of beamforming, the amount of feedback information for selecting an optimized antenna group is increased and process steps of communication are increased correspondingly, whereby the time required for the process steps or power consumption is increased.

Accordingly, the present invention is directed to a precoding method for spatial multiplexing in a MIMO system, which substantially obviates ones or more problems due to limitations and disadvantages of the related art.

An object of the present invention is to provide a precoding method for spatial multiplexing in a MIMO system, in which the MIMO system based on a singular value decomposition (SVD) scheme and beamforming based on split type antenna groups are used together during a precoding process.

Another object of the present invention is to provide a precoding method for spatial multiplexing in a MIMO system, in which a minimum number of subchannels are used, and matrix dimensions of an encoder and a decoder included in the MIMO system are equivalent to the number of subchannels and the number of antenna groups not the number of antennas, whereby signal processing can be simplified.

Other object of the present invention is to provide a precoding method for spatial multiplexing in a MIMO system, in which the MIMO system based on a singular value decomposition (SVD) scheme is implemented without feedback information transmitted and received between devices.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for performing spatial multiplexing precoding in a transmitting device, which includes a plurality of antennas, comprises the steps of performing a beam searching process for beamforming with a receiving device that includes a plurality of antennas; transmitting a first packet, which includes at least one training sequence, to the receiving device after performing the beam searching process; receiving a second packet comprising feedback information for precoding from the receiving device, wherein the feedback information is determined using the training sequence; and performing spatial multiplexing precoding for data streams to be transmitted to the receiving device, by using a precoding matrix obtained based on the feedback information.

Preferably, the first packet is transmitted if the number of ranks of a channel matrix determined by the beam searching process is greater than 1.

The at least one training sequence is the training sequence for each spatial multiplexing port.

The at least one training sequence includes different training sequences for different spatial multiplexing ports.

The feedback information is related to precoding angles for obtaining the precoding matrix. In this case, the number and order of the precoding angles are determined depending on the number of data streams and the number of spatial multiplexing ports.

In another aspect of the present invention, a transmitting device for transmitting data to a receiving device by using a plurality of antennas comprises a beamforming module performing a beam searching process for beamforming with the receiving device that includes a plurality of antennas; a transmitting and receiving module transmitting a first packet, which includes at least one training sequence, to the receiving device after performing the beam searching process, and receiving a second packet comprising feedback information for precoding from the receiving device, wherein the feedback information is determined using the training sequence; and a spatial multiplexing precoder performing spatial multiplexing precoding for data streams to be transmitted to the receiving device, by using a precoding matrix obtained based on the feedback information.

In other aspect of the present invention, a method for transmitting feedback information for spatial multiplexing precoding from a receiving device, which includes a plurality of antennas, comprises the steps of performing a beam searching process for beamforming with a transmitting device that includes a plurality of antennas; receiving a first packet, which includes at least one training sequence, from the transmitting device after performing the beam searching process; determining feedback information for precoding in the receiving device by using the training sequence; transmitting a second packet, which comprises the feedback information, to the transmitting device; and receiving data subjected to spatial multiplexing precoding, from the transmitting device by using a precoding matrix obtained based on the feedback information.

The aforementioned embodiments are only a part of the preferred embodiments of the present invention, and various embodiments on which technical features of the present invention are reflected can be devised and understood by the person with ordinary skill in the art based on the detailed description of the present invention, which will be described later.

Advantageous Effects

According to the embodiment of the present invention, the MIMO system based on a singular value decomposition (SVD) scheme and beamforming based on split type antenna groups are used together during a precoding process, whereby a minimum number of subchannels can be used for signal transmission. Also, as matrix dimensions of an encoder and a decoder included in the MIMO system are equivalent to the number of subchannels and the number of antenna groups not the number of antennas, whereby signal processing can be simplified.

Moreover, the MIMO system based on a singular value decomposition (SVD) scheme can be implemented through postamble transmission without feedback information transmitted and received between devices.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram illustrating an example of a beforming pattern in a beamformer of an SVD based SM MIMO system according to one embodiment of the present invention;

FIG. 16 is a diagram illustrating an example of a feedback data format transmitted from an SVD based SM MIMO receiving device according to one embodiment of the present invention;

FIG. 17 is a diagram illustrating another example of a feedback data format transmitted from the SVD based SM MIMO receiving device according to one embodiment of the present invention;

FIG. 19 is a diagram illustrating other example of a feedback data format transmitted from the SVD based SM MIMO receiving device according to one embodiment of the present invention;

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts.

Recently, Bluetooth and wireless personal area network (WPAN) technologies have been developed, which form a wireless network between a relatively small number of digital devices in limited places such as homes or small companies to allow audio or video data to be exchanged between the devices. The WPAN can be used for information exchange between a relatively small number of digital devices in a relatively close distance, and enables low power and low-cost communication between the digital devices. IEEE 802.15.3 (Wireless Medium Access Control (MAC) and Physical Layer (PHY) Specifications for High Rate Wireless Personal Area Networks (WPANs)) approved on Jun. 12, 2003 defines specification of a MAC layer and a physical (PHY) layer of high rate WPAN.

Figure 1:
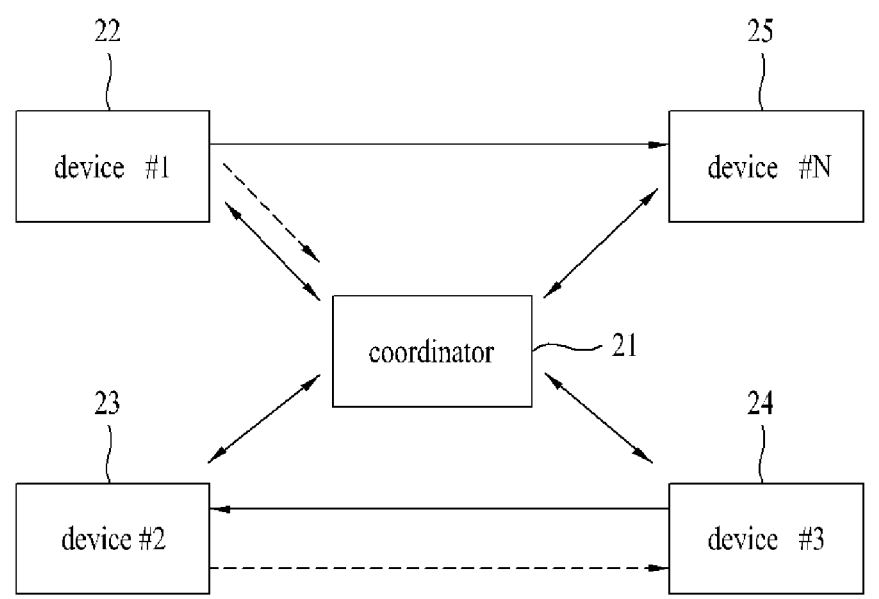
FIG. 1 is a diagram illustrating an example of a WPAN.

FIG. 1 is a brief diagram illustrating an example of a wireless video area network (WVAN). As illustrated in FIG. 1, the WVAN is a network configured between personal devices within a limited space such as home, and allows information to be exchanged between applications without seamlessness by configuring a network through direct communication between devices.

Referring to FIG. 1, the WVAN includes two or more user devices 22 to 25, one of which acts as a coordinator 21. The coordinator 21 provides basic timing of the WVAN, maintains track of devices belonging to the WVAN, and serves to control quality of service (QoS) requirements. The coordinator performs its function and at the same time serves as one device belonging to the WVAN. Other devices 22 to 25 different from the coordinator 21 can start stream connection.

The WVAN illustrated in FIG. 1 supports two kinds of physical (PHY) layers, namely, high-rate physical (HRP) layer and low-rate physical (LRP) layer. The HRP layer is a physical layer that can support a data transmission rate of 1 Gb/s or greater, and the LRP layer is a physical layer that supports a data transmission rate of several Mb/s. The HRP layer is highly directional, and is used for transmission of isochronous data streams, asynchronous data, MAC command and A/V control data through unicast connection. The LRP layer supports a directional or omni-directional mode and is used for transmission of beacon, asynchronous data, MAC command through unicast or broadcasting. The coordinator 21 can transmit or receive data to and from other device using the HRP and/or LRP layer. The other devices 22 to 25 of the WVAN can also transmit or receive data using the HRP and/or LRP layer.

Figure 2:
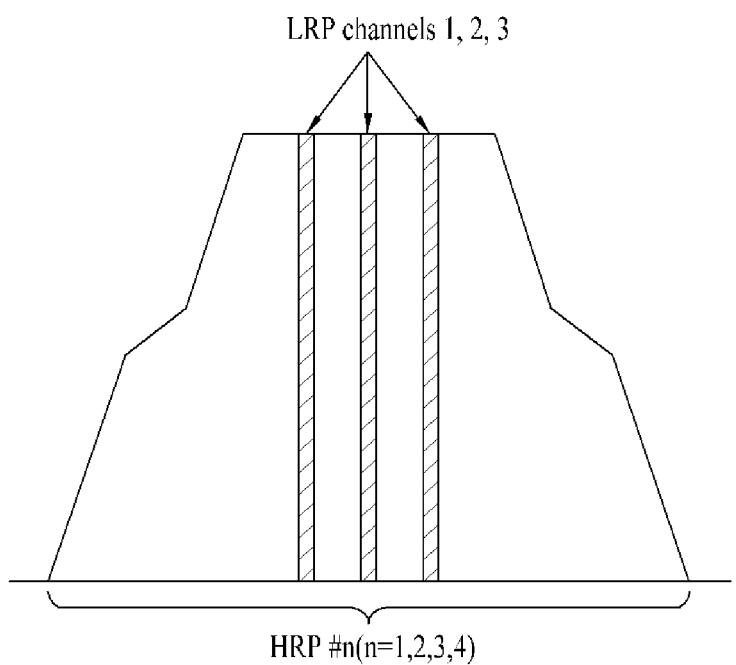
FIG. 2 is a diagram illustrating a frequency band of HRP channels and LRP channels used in a WVAN.

FIG. 2 is a diagram illustrating a frequency band of HRP channels and LRP channels used in a WVAN. The HRP layer uses four channels of a bandwidth of 2.0 GHz in a band of 57 to 66 GHz, and the LRP layer uses three channels of a bandwidth of 92 MHz. As illustrated in FIG. 2, the HRP channels and the LRP channels share a frequency band and are used respectively by a TDMA mode.

Figure 3:
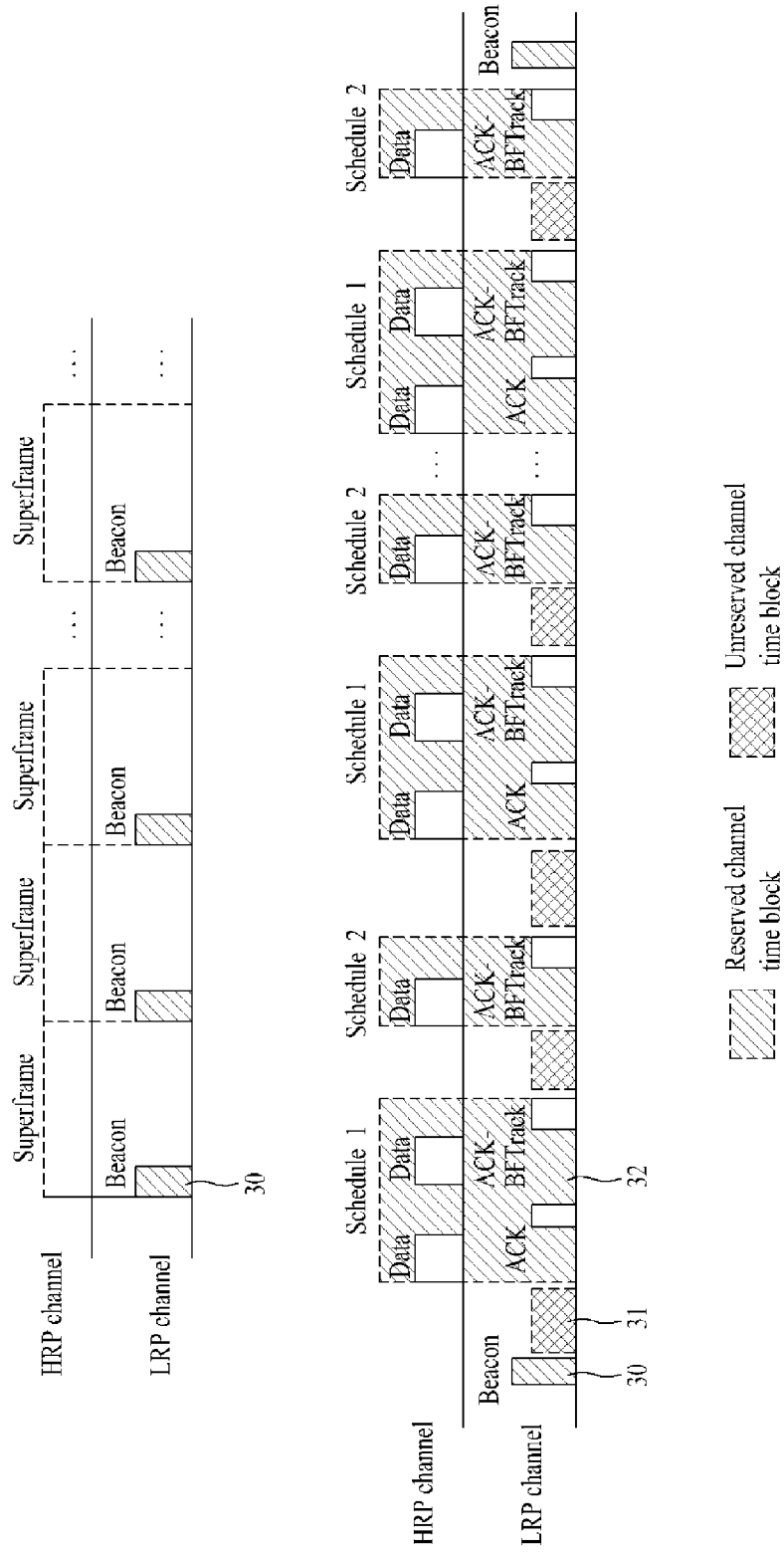
FIG. 3 is a diagram illustrating an example of a structure of a superframe used in a WVAN.

FIG. 3 is a diagram illustrating an example of a structure of a superframe used in a WVAN. Referring to FIG. 3, each superframe includes a beacon region 30 where a beacon is transmitted, a reserved region 32 that includes a reserved channel time block allocated to a random device by the coordinator in accordance with a request of the devices, and an unreserved region 31 that includes an unreserved channel time block that is not allocated by the coordinator but transmits and receives data between the coordinator and device or between devices in accordance with a contention based mode, wherein each of the regions is time divided. Each of channel time blocks (CTB) is time divided into an HRP region where data are transmitted through HRP and an LRP region where data are transmitted through LRP. The beacon 30 is periodically transmitted by the coordinator to identify a beginning part of each superframe, and includes scheduled timing information and management and control information of the WVAN. The device can exchange data in the network through the timing information and management/control information included in the beacon.

In the HRP region, the reserved CTB field can be used to transmit data from a device, to which channel time is allocated by the coordinator in accordance with a channel time allocation request of the device, to other device. If a specific device transmits data to other device through the reserved CTB field, the HRP channel is used. If the device that receives the data transmits ACK/NACK signal of the received data, the LRP channel is used.

The unreserved CTB field can be used to transmit control information, MAC command, or asynchronous data between the coordinator and the device or between the devices. In order to prevent data collision between the devices in the unreserved CTB field, a carrier sense multiple access (CSMA) mode or a slotted Aloha mode can be used. In the unreserved CTB field, data can be transmitted through the LRP channel only. If there are many kinds of control information or commands to be transmitted, the reserved region may be set in the LRP channel. In each superframe, the length and the number of reserved CTB fields and unreserved CTB fields can be varied per superframe and are controlled by the coordinator.

Furthermore, although not shown in FIG. 3, each superframe includes a contention-based control period (CBCP) located next to the beacon to transmit urgent control/management messages. The length of the CBCP is set so as not to exceed a given threshold value mMAXCBCPLen.

Figure 4:
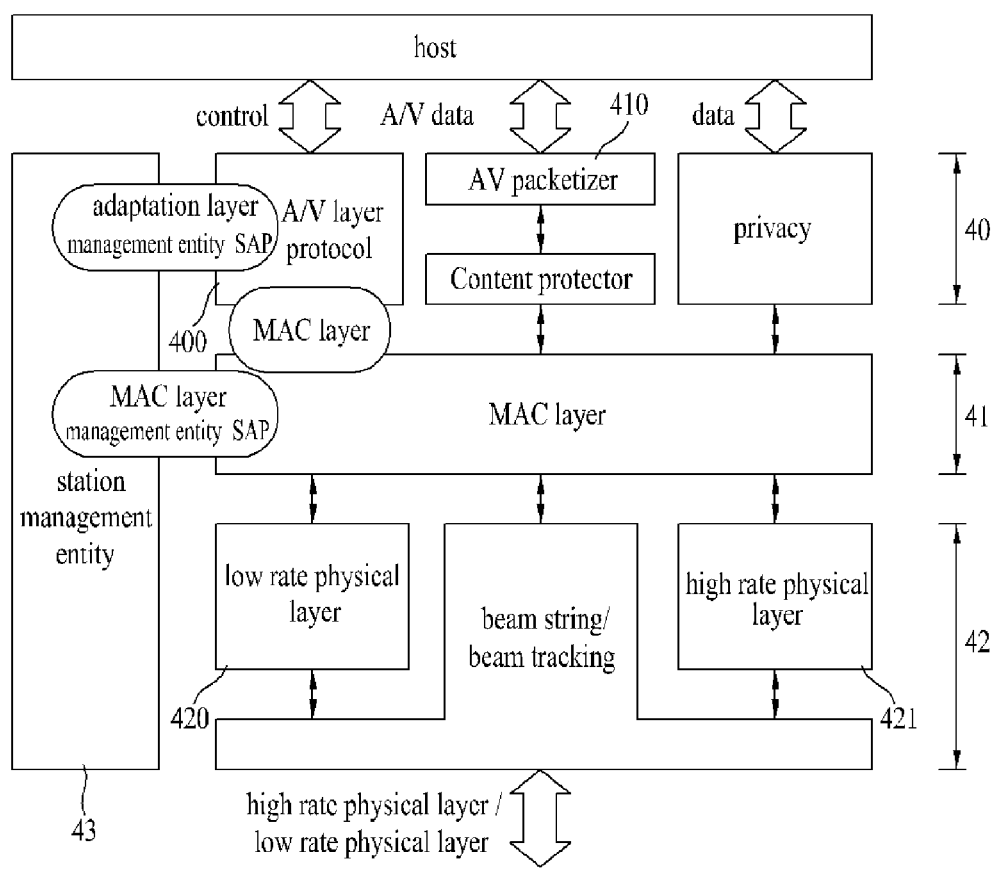
FIG. 4 is a diagram illustrating a protocol layer structure implemented in a device of a WVAN.

FIG. 4 is a diagram illustrating a protocol layer structure implemented in a device of a WVAN.

Referring to FIG. 4, a communication module of each device included in the WVAN can include four layers depending on its function. Generally, the communication module includes an adaptation sublayer 40, a MAC layer 41, a PHY layer 42, and a station management entity (SME) layer 43. In this case, a station is a device differentiated from the coordinator, and the station management entity (SME) means a device management entity (DME). The station management entity (SME) is a layer independent entity that controls a lower layer and collects status information of the device from each layer. The station management entity SME includes entities that manage each layer of the communication module. In this case, an entity that manages the MAC layer will be referred to as a MAC layer management entity (MLME), and an entity that manages the adaptation layer will be referred to as an adaptation layer management entity (ALME).

The adaptation sublayer 40 includes an AVC protocol 400 and an A/V packetizer 410. The AVC protocol 400 is an upper layer that performs device control and streaming connection for A/V data transmission between a transmitting device and a receiving device. The A/V packetizer 410 formats A/V data for HRP data service.

The MAC layer 41 takes the role in link setup, connection or non-connection, and channel access to a lower layer of a material transmission protocol, and also takes the role in reliable data transmission. In other words, the MAC layer 41 serves to transmit a control/data message or control a channel.

The PHY layer 42 may directly process A/V data, or the A/V data may be processed simultaneously by the PHY layer 42 and the MAC layer 41. The PHY layer is responsible for the task to convert a message requested from the upper layers such as the adaptation layer 40 and the MAC layer 41, so that the message can be transmitted and received between devices by the PHY layer. Also, the PHY Layer includes the aforementioned two kinds of physical layers, HRP layer 420 and LRP layer 421.

The layers of the device provide services such as a high rate service, a low rate service, and a management service. The high rate service is used for video, audio and data transfer, and the low rate service is used for transmission of audio data, MAC command, and asynchronous data of small capacity. The respective layers transmit and receive a simple message to and from each other before a process of data exchange is performed between the respective layers. The message exchanged between such different layers will be referred to as primitive.

In the aforementioned WVAN, the respective devices include a plurality of transmitters and receivers to transmit and receive a signal to and from each other within a limited bandwidth condition. For example, the MIMO (Multiple Input Multiple Output) technology can be used, in which the transmitting device and the receiving device provided with a plurality of antennas transmit data packets by using the antennas.

Figure 5:
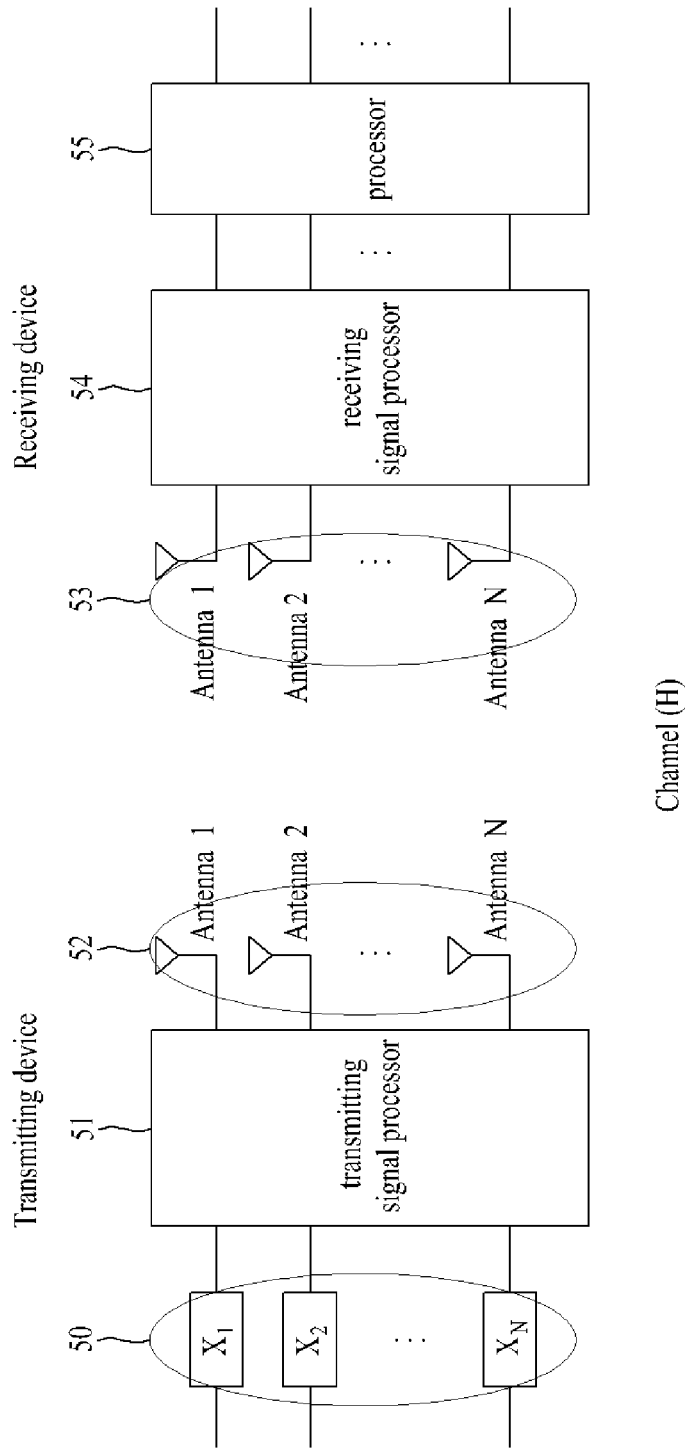
FIG. 5 is a block diagram illustrating an example of a device having a plurality of antennas in a WVAN according to one embodiment of the present invention.

FIG. 5 is a block diagram illustrating an example of a device having a plurality of antennas in a WVAN according to one embodiment of the present invention.

Referring to FIG. 5, the transmitting device includes a plurality of transmitters 50, a transmitting MIMO signal processor 51 performing signal processing such as coding to conveniently transmit signals output from the plurality of transmitters 50, and a plurality of transmitting antennas 52. The receiving device includes a plurality of receiving antennas receiving the signals output from the transmitting device, a receiving MIMO signal processor 54 performing decoding for the received signals to detect a plurality of independent transmitting signals, and a processor 55.

According to the MIMO technology, a plurality of different data packets are transmitted in parallel in accordance with various MIMO schemes by using a plurality of antennas provided in the transmitting device and the receiving device, whereby efficiency in data transmission can be improved. Also, according to the MIMO technology, same data packets are transmitted by using different antennas, whereby antenna diversity gain can be obtained. For example, if the transmitting device illustrated in FIG. 5 includes N transmitting antennas 52 and the receiving device transmits data packets at the same time by using N receiving antennas 53, a data rate can be increased as much as N times.

However, a problem occurs in that interference may occur between channels formed between each of the N transmitting antennas 52 and each of the N receiving antennas 53. In order to solve the problem, although complex decoding, filtering and detection algorithm are used in the transmitting side and the receiving side, a data rate is reduced correspondingly, Accordingly, if mutually independent channels are formed so as not to cause inter-channel interference or are adaptively controlled under the flexible fading condition, the receiving device can be configured simply and system capacity can be maximized. In this way, the MIMO technology can be improved.

To this end, the plurality of antennas of the transmitting device and the receiving device illustrated in FIG. 5 can be configured by at least one or more antenna groups. The antenna groups will be described later.

An example of the aforementioned MIMO system includes a SM (Spatial Multiplexing) MIMO system in which different signals are transmitted through multiple antennas by using the same frequency, the same space, and the same time. Since the SM MIMO system has low correlation between the respective antennas, different data mixed in time and frequency are stably decoded, whereby a received SNR at a radio interval can be maintained with a given value or greater and at the same time multiple paths are increased. In this way, optimized throughput can be obtained.

In the mean time, the SM MIMO system can be divided into an open-loop SM MIMO system and a closed-loop SM MIMO system depending on transmission of feedback information.

In the open-loop SM MIMO system, it is not required that feedback information is transmitted from the receiving device. Accordingly, although the open-loop SM MIMO system can have a simple structure, the transmitting device has limitation in system capacity and operation due to a channel characteristic matrix of a given radio channel. In the open-loop SM MIMO system, if a current radio channel is predicted as a SM MIMO based channel in a state that the transmitting device does not know substantial values of the radio channel, different data are carried in the plurality of antennas of the transmitting device so that the data are transmitted at a high transmission rate. If it is determined that the current radio channel is not suitable for the SM MIMO system, the plurality of antennas are used for diversity to perform reliable transmission.

On the other hand, in the closed-loop SM MIMO system, the transmitting device acquires more exact information on the current radio channel by receiving feedback information from the receiving device, wherein the feedback information is in response to the signals transmitted from the transmitting device. The transmitting device can obtain optimized throughput based on the acquired information. If the transmitting device requests information of feedback information by transmitting the signals to the receiving device, the receiving device transmits feedback information, which includes the number of data streams and channel quality information (CQI), to the transmitting device. The transmitting device that has received the feedback information can perform any one of antenna grouping, selection of available antenna from the plurality of antennas or antenna groups, and precoding, based on the feedback information, wherein the antenna grouping means that the plurality of antennas are allocated to one or more groups. Antenna grouping and antenna selection may be regarded as simple type precoding.

In the general MIMO system, since different signals are transmitted through different antennas at the same time and the same frequency band, if various signals are mixed with each other, the receiving device may fail to receive the signals. Accordingly, the transmitting device performs precoding for the bit streams for transmission. MIMO throughput may be varied depending on a precoding matrix W. The transmitting device can select a precoding matrix W depending on a transmission rate of data received from the receiving device or information on the number of streams.

At this time, the transmitting side can obtain a precoding matrix W by decomposing a channel matrix H in accordance with a singular value decomposition (SVD) system so as to select an optimized precoding matrix. The SVD means that a matrix is decomposed in a specific structure, and generalizes a spectral theory of the matrix for a random rectangular matrix. In other words, the SVD system means that an orthogonal square is decomposed into a diagonal matrix based on an eigen value.

The SM MIMO system that performs precoding by using the precoding matrix obtained through the aforementioned SVD system can be defined as the SVD based SM MIMO system.

The SVD based SM MIMO system includes a plurality of transmitting antennas and a plurality of receiving antennas and is useful to transmit a plurality of data streams through the plurality of antennas during data transmission. In other words, if the transmitting device obtains a precoding matrix from a unique vector obtained by decomposing the channel matrix H based on the feedback information from the receiving device and performs SVD based precoding for the signals for transmission, MIMO channels can be split into different independent channels.

However, according to the SVD based SM MIMO system, since the transmitting side should know channel information such as a channel correlation matrix, it should periodically receive the feedback information from the receiving side. Also, since the SVD based SM MIMO system uses a plurality of antennas and dimensions of the precoding matrix are increased or decreased depending on the number of antennas, a precoding operation process is complicated if the number of antennas is increased, whereby system implementation is complicated.

For example, it is assumed that the SVD based SM MIMO system includes a transmitting device provided with M antenna groups and a receiving device provided with N antenna groups, each antenna group including n antennas. In this way, in a state that the SVD based SM MIMO system includes M×n transmitting antennas and N×n receiving antennas, if M=N=8 and N=4, M×n and N×n are 32, respectively, whereby the number of transmitting antennas and the number of receiving antennas have great values. In the MIMO system, in order to obtain an available subchannel maximum value, the channel matrix H, SVD spatial encoder matrix V, and SVD spatial decoder matrix U should be measured. The matrix H has a dimension of (N×n)×(M×n), the matrix V has a dimension of (M×n)×K (K=min{M×n, N×n}), and the matrix U has a dimension of (N×n)×K dimension. Accordingly, the number of transmitting antennas and the number of receiving antennas are used for an operation process for signal processing, the process becomes complicated. Hereinafter, the SVD based SM MIMO system will be described with reference to FIG. 6.

Figure 6:
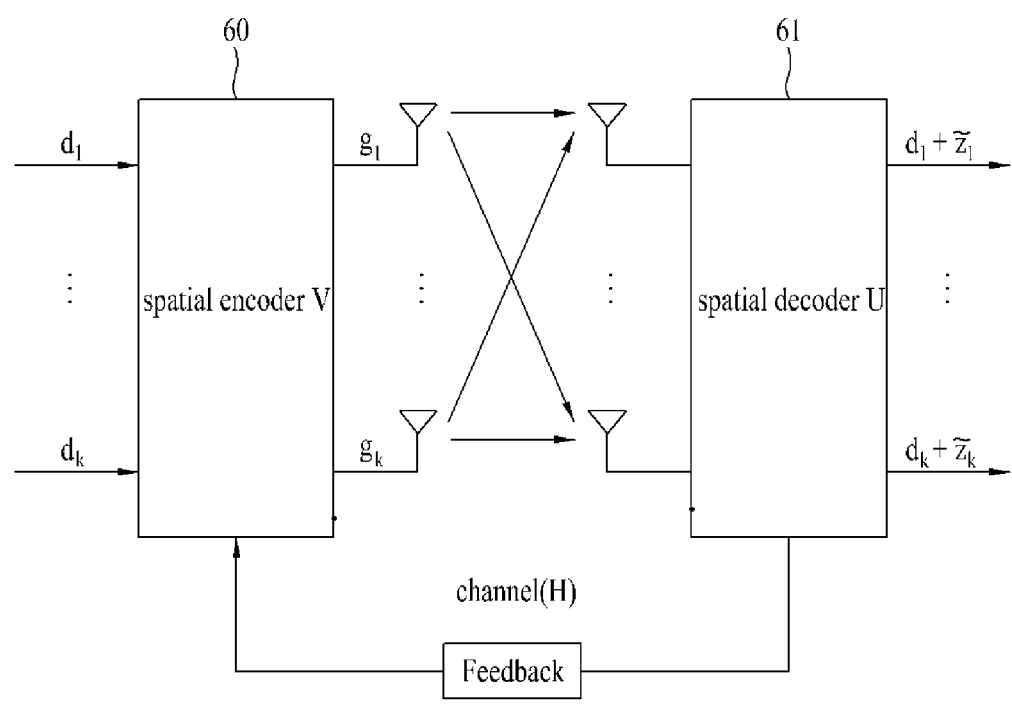
FIG. 6 is a diagram illustrating an example of an SVD MIMO system according to one embodiment of the present invention.

FIG. 6 is a diagram illustrating an example of an SVD MIMO system according to one embodiment of the present invention.

Referring to FIG. 6, the transmitting device includes an SVD spatial encoder 60 and M transmitting antenna groups, and the receiving device includes an SVD spatial decoder 61 and N receiving antenna groups.

Before signal transmission, the SVD spatial encoder 60 performs coding for each bit stream such that signals are transmitted through a channel provided with a plurality of uncorrelation orthogonal subchannels. This coding process may be referred to as precoding. A precoder that performs precoding may be included in the SVD spatial encoder, or may be provided separately from the SVD spatial encoder. The SVD spatial decoder 61 of the receiving device performs decoding for splitting the signal transmitted through the receiving antennas into mutual independent stream signals based on the number of uncorrelation subchannels.

Equation 1 is directed to an SVD channel matrix H based on a singular value decomposition system.

$$H = U\Lambda^{1/2}V^H \quad \text{[Equation 1]}$$

In the Equation 1, $\Lambda = \text{diag}\{\lambda_1, \lambda_2, \ldots, \lambda_K\}$ represents a diagonal matrix that includes an eigen value $\lambda_i$ of a matrix $HH^H$ or $H^HH$. The matrix $U = (U_1, U_2, \ldots, U_K)$ includes an eigen vector of the matrix $HH^H$, the matrix $V = (V_1, V_2, \ldots, V_K)$ includes an eigen vector of the matrix $H^HH$, and K represents the number of ranks of the channel matrix H.

In the transmitting device, input symbols $d_1, d_2, \ldots, d_K$ can be implemented by spatial symbols $D = (d_1, d_2, \ldots, d_K)^T$ of K dimension. The data stream of the input symbols is multiplexed by a weight coefficient and spatially coded through the spatial encoder 60.

Vectors $G = (g_1, g_2, \ldots, g_M)^T$ of M dimension for the signals output from the spatial encoder 60 can be expressed by Equation 2.

$$G = VP^{1/2}D \quad \text{[Equation 2]}$$

In the Equation 2, $P = \text{diag}\{p_1, p_2, \ldots, p_M\}^T$ is a diagonal matrix of $p_i$, and is characterized in power distribution $P_o$ on subchannels of a parallel structure. The $P_o$ is a sum of values constituting the matrix P. The coded signals are transmitted to the receiving device by M antenna groups.

In the receiving device, the signals received through the N antenna groups are decoded by the spatial decoder 61. Supposing that the received symbols are $X = (x_1, x_2, \ldots, x_N)^T$, if the symbols are decoded by the matrix $U^H$ of the spatial decoder 61, the symbols can be output as $Y = (y_1, y_2, \ldots, y_N)^T$. The vector X for the signals received by the receiving device through the channel can be expressed by Equation 3.

$$X = HVP^{1/2}D + Z \quad \text{[Equation 3]}$$

In the Equation 3, $P^{1/2}D$ represents data transmitted from the transmitting device to the receiving device, and Z represents noise occurring when the receiving device receives the data.

Supposing that a decoding matrix of the SVD spatial decoder 61 is $U^H$, the decoded output signals Y can be defined as $Y = U^H X$, and can be expressed by Equation 4 by substituting for the Equation 3.

$$Y = U^H HVP^{1/2}D + \tilde{Z} \quad \text{[Equation 4]}$$

In the Equation 4, $\tilde{Z}$ represents that noise Z mixed in the received signals is decoded, and satisfies $\tilde{Z} = U^H Z$.

If the Equation 4 is substituted for the channel matrix H of the Equation 1, the output signal of the spatial decoder 61 can be expressed by Equation 5.

$$Y = \Lambda^{1/2}P^{1/2}D + \tilde{Z} \quad \text{[Equation 5]}$$

The Equation 5 may be expressed as $y_i = \sqrt{p_i \lambda_i} d_i + \tilde{z}_i$.

Since one or more subchannels used in the MIMO system according to one embodiment of the present invention are uncorrelation independent channels, noise occurs as much as the number of the subchannels during transmission through the subchannels and has uncorrelation characteristics. The noise may occur in various manners, and its example includes additive white Gaussian noise (AWGN). The noise Z before it is decoded by the spatial decoder 61 is the same as or similar to the decoded noise $\tilde{Z}$.

Accordingly, the correlation subchannels in parallel are subchannels split by orthogonal phase, and can be used for independent symbol transmission. In this respect, the subchannels may be the same as or similar to eigen channels.

The SVD based SM MIMO system uses K independent subchannels as K independent single channel systems. The subchannel gain coefficient is determined by a unique value of the channel matrix H. The channel matrix H has a dimension of (N×n)×(M×n) depending on the number of M of transmitting antennas, the number N of receiving antenna groups, and n antennas constituting the antenna groups. Accordingly, if the number of antenna groups or the number of subchannels is increased, the dimensions of the channel matrix are increased, and coding and decoding processes based on the above Equation become complicated.

Accordingly, the SVD based SM MIMO system according to one embodiment of the present invention restricts that a predetermined number of subchannels are only used for data transmission. Also, in order to maximize a signal to noise ratio, a directional signal, i.e., beam, for a specific object can be used.

Beamforming is one type of smart antenna and means that a directional signal is transmitted to a specific object by using a plurality of antennas to enhance efficiency. In the SM MIMO system which is an example of MIMO in which both a transmitting device and a receiving device include a plurality of antennas, a WVAN device can transmit a signal to another device by performing beamforming through the HRP channel. In other words, the WVAN device can transmit SM HRP data packets through beamforming.

In the SM MIMO system, the plurality of antennas included in the device can be divided into one or more beamforming antenna groups.

The beamforming antenna group represents an antenna array that includes one or more antennas for forming a directional signal, i.e., beam. Hereinafter, the antenna array that forms a specific beam will be defined as the beamforming antenna group. The beamforming antenna group may mean a beamformer or antenna port, which forms a beam pattern.

The beamforming antenna group can be divided into a split beamforming antenna group and a shared beamforming antenna group depending on the number and arrangement of antennas included in one antenna group. Hereinafter, the MIMO system based on the antenna group will be described in brief with reference to FIG. 7 and FIG. 8.

Figure 7:
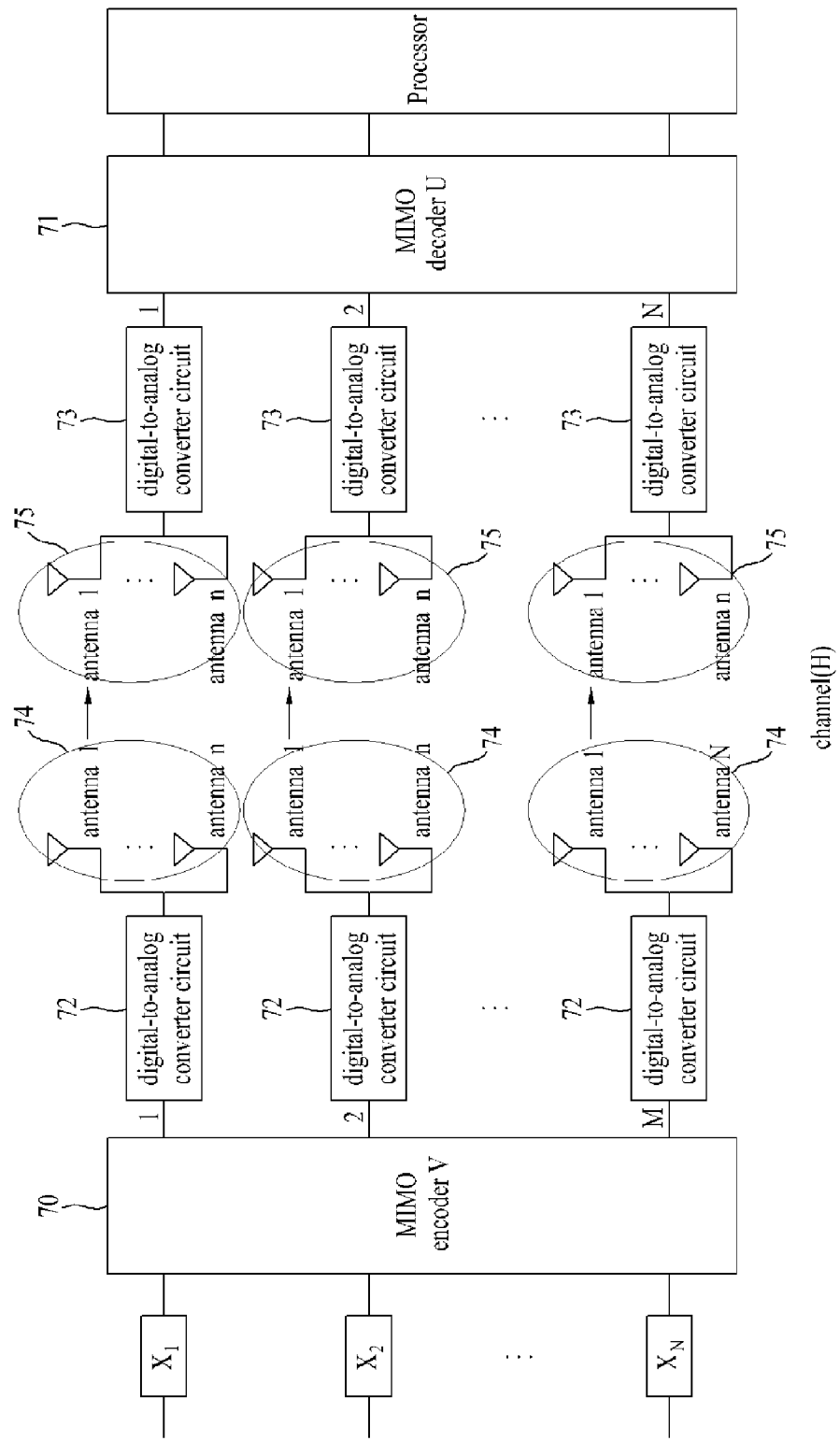
FIG. 7 is a block diagram illustrating an example of a device having a plurality of antenna groups in an SM MIMO system according to one embodiment of the present invention.

FIG. 7 is a block diagram illustrating an example of a device having a plurality of antenna groups in an SM MIMO system according to one embodiment of the present invention. In more detail, FIG. 7 illustrates an example of a device provided with a split antenna group to perform HRP beamforming.

Referring to FIG. 7, the transmitting device includes a MIMO encoder 70 performing encoding for splitting data for transmission into a plurality of bit streams, a digital-to-analog converter circuit 72 converting an analog signal to a digital signal for convenience of signal transmission, and a plurality of beamforming antenna groups 74. Likewise, the receiving device includes a plurality of beamforming antenna groups 75, an analog-to-digital converter circuit 73 and a MIMO decoder 71.

The beamforming antenna groups 74 and 75 are split beamforming antenna groups and include successive antenna streams split equally in each antenna group. The beamforming antenna groups are implemented easily by configuring the same number of successive antenna streams for each antenna group. Also, the split beamforming antenna groups are characterized in that signal processing steps are simplified and transmission power is concentrated as signals from a plurality of transmitters are transmitted through one antenna group. However, the split beamforming antenna groups are disadvantageous in that it is difficult to perform adaptive control such as change of antenna included in each antenna group or change of the antenna group in service depending on the channel status. Accordingly, the split beamforming antenna group may be referred to as a non-adaptive antenna group.

Figure 8:
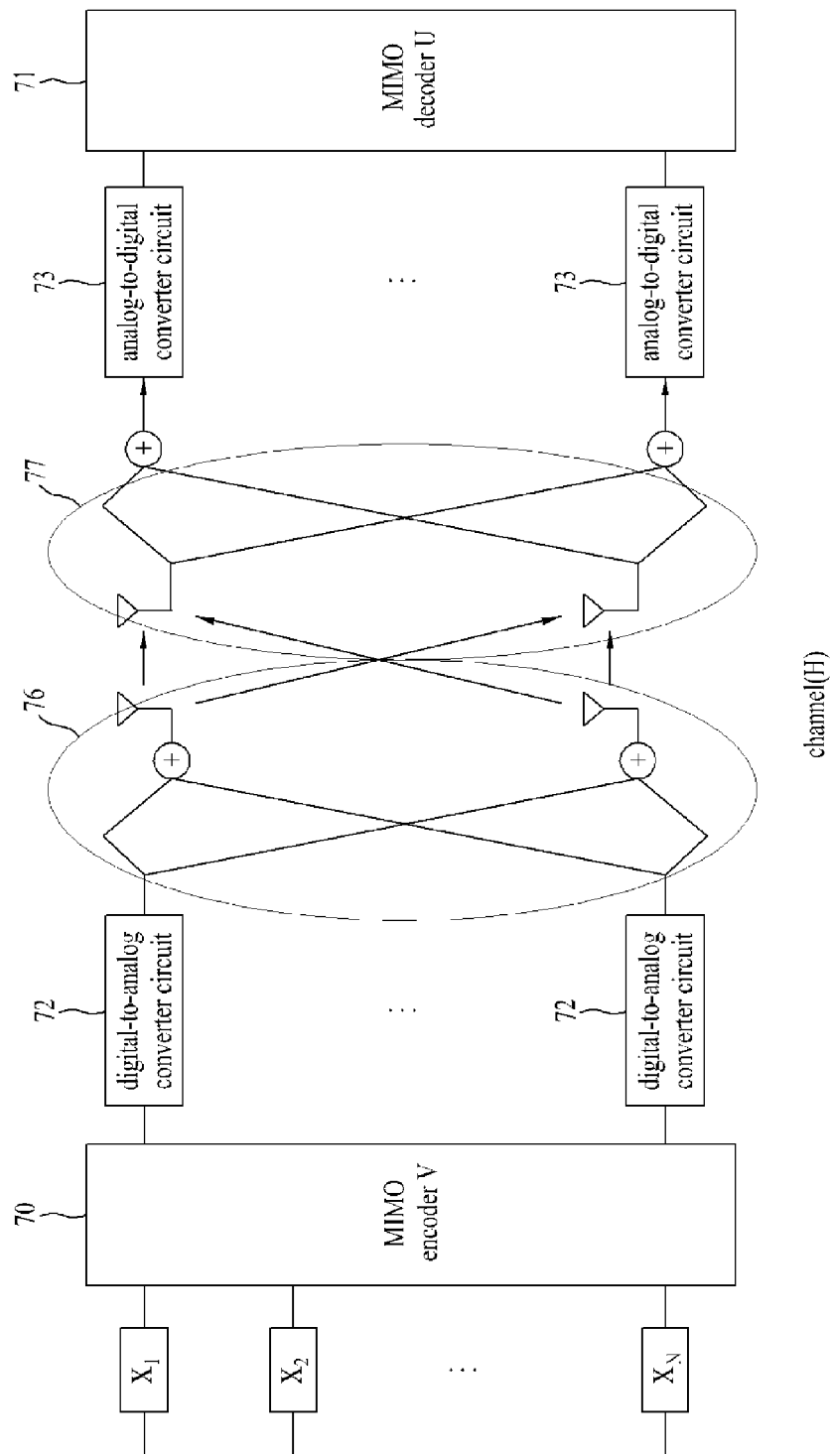
FIG. 8 is a block diagram illustrating another example of a device having a plurality of antenna groups in an SM MIMO system according to one embodiment of the present invention.

FIG. 8 is a block diagram illustrating another example of a device having a plurality of antenna groups in an SM MIMO system according to one embodiment of the present invention. In more detail, FIG. 8 illustrates an example of a device provided with a shared antenna group to perform HRP beamforming.

The beamforming antenna groups 76 and 77 are shared beamforming antenna groups, and may include different number of antennas per each antenna group or may include randomly distributed antennas to configure a group. The shared beamforming antenna groups can be reconfigured by combination that can maximize transmission capacity by adaptively controlling the number of antennas constituting each antenna group depending on the channel status. Accordingly, the shared beamforming antenna group may be referred to as an adaptive antenna group.

In the MIMO system, at least one beamforming antenna group may be selected from one or more beamforming antenna groups to transmit data packets. A plurality of beamforming antenna groups may be selected to transmit data packets through antennas included in each beamforming antenna group.

At this time, the signals transmitted through each beamforming antenna group as described above are directional signals. It is preferable that interference between the signals transmitted through each beamforming antenna group is minimized. In other words, the transmitting device and the receiving device may transmit signals through an antenna array constituting each beamforming antenna group, wherein the antenna array has different phases, for example, orthogonal phases.

The MIMO system according to one embodiment of the present invention illustrates that the SVD based SM MIMO system of FIG. 6 includes the non-adaptive beamforming antenna group of FIG. 7.

Figure 9:
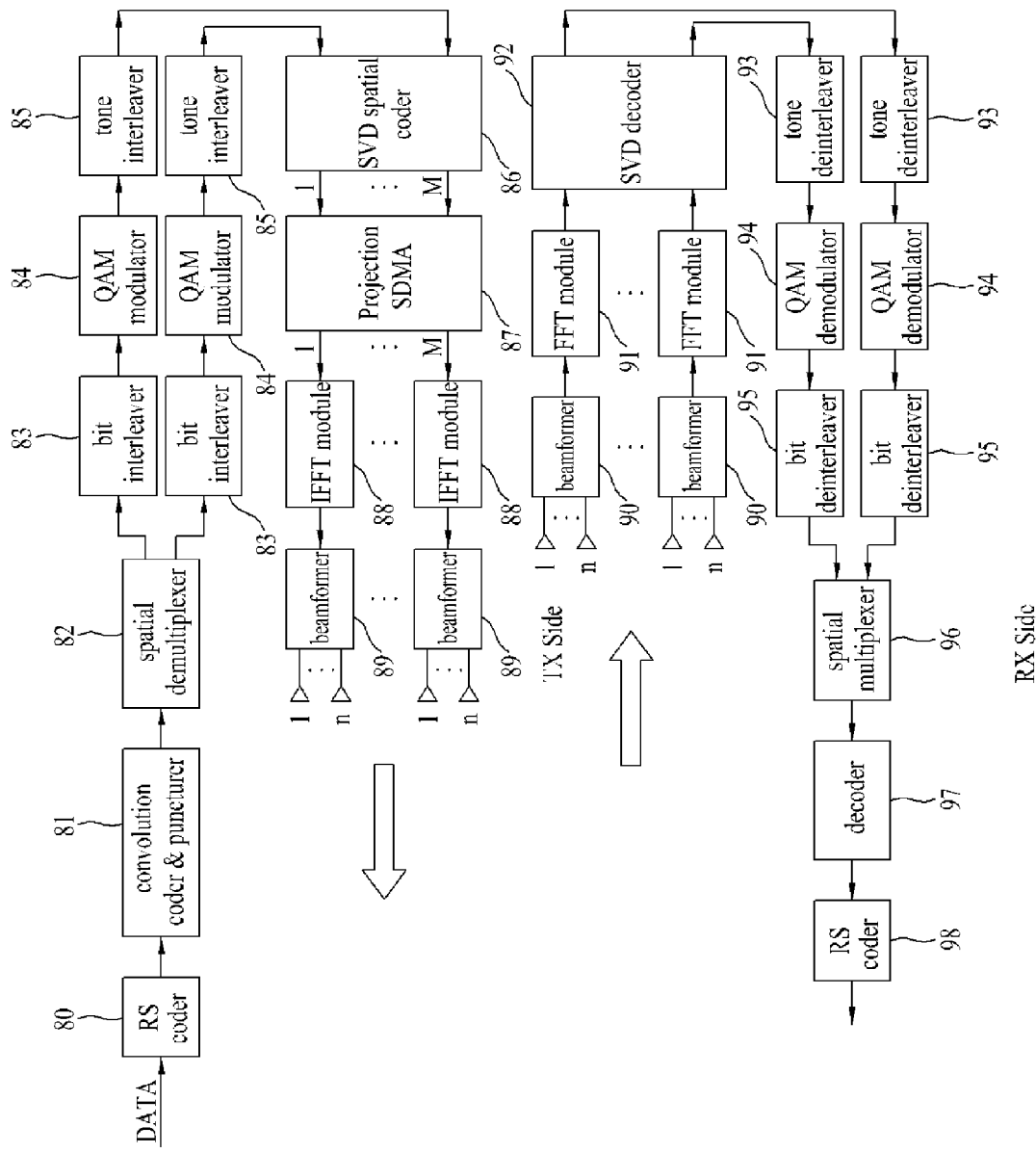
FIG. 9 is a block diagram illustrating an example of an SVD based SM MIMO device that performs beamforming in an WVAN according to one embodiment of the present invention.

FIG. 9 is a block diagram illustrating an example of a device that performs beamforming through HRP in an SM MIMO system according to one embodiment of the present invention.

Referring to FIG. 9, the transmitting device and the receiving device, which constitute the SVD based SM MIMO system, include one or more beamforming antenna groups for transmitting and receiving directional signals to and from each other. The transmitting device and the receiving device are implemented to transmit signals by using minimum subchannels. For example, two subchannels are used.

Referring to FIG. 9, data to be transmitted from the transmitting device are coded by RS coder 80, and then transmitted to a spatial demultiplexer 82 through a convolution coder & puncturer 81 for adding an error correction code. The spatial demultiplexer 82 splits one data block in accordance with a modulation coding scheme (MCS). At this time, the data block can be split into bit streams depending on the number of subchannels which are to be used. If minimum two subchannels are used as above, the spatial demultiplexer 82 splits the data block into two bit streams and perform independent signal processing for each bit stream. The split bit streams are transmitted through a bit interleaver 83 uniformly interleaving neighboring bits, a modulator 84 encoding data in accordance with QAM (quadrature magnitude modulation), and a tone interleaver 85 processing a tone signal.

The bit streams subjected to signal processing are input to a singular value decomposition (SVD) spatial encoder 86. In the above embodiment, when the transmitting device transmits a plurality of bit streams through a plurality of channels, the SVD spatial encoder 86 performs coding in such a way to operate a channel matrix previously set in each bit stream, thereby discriminating phase of each bit stream. Accordingly, in one embodiment of the present invention, the SVD spatial encoder performs coding for data transmitted through the transmitting antennas to form orthogonal subchannels through the channels. To this end, SVD spatial encoding matrix is configured by V=(V$_1$, V$_1$).

Next, a spatial division multiplexing access (SDMA) unit 87 performs coding for a total of M bit streams to minimize signal interference between a signal transmitted and received between a pair of transmitting device and receiving device and a signal of another device. The coded bit streams are subjected to inverse fast fourier transform (IFFT) by an IFFT module 88 and then transmitted to the receiving device through a beamformer array. The beamformer array includes M beamformers, each of which is a beamforming antenna group that include n antennas.

Referring to FIG. 9, the receiving device has a similar structure of the aforementioned transmitting device to receive a signal in the MIMO system. First of all, the receiving device receives a signal transmitted from the transmitting device through a total of M beamformer arrays 90 that include n antennas. The received signal is subjected to fast fourier transform (FFT) by a FFT module 91 and then input to an SVD spatial decoder 92. The SVD spatial decoder 92 performs decoding for outputting two mutual independent bit stream signals from the signal transmitted from the transmitting device.

The two stream signals from the SVD spatial decoder 92 are subjected to independent signal processing through a tone deinterleaver 93, a QAM demodulator 94, and a bit deinterleaver 95. The two stream signals are formed in the form of one data stream through a spatial multiplexer 96 to facilitate transmission.

In the aforementioned SVD MIMO system according to one embodiment of the present invention, coding or decoder performed by the SVD spatial encoder 86 or the SVD spatial decoder 92 can be simplified in accordance with a scheme which will be described hereinafter. The matrix V of the SVD spatial encoder 86 can be configured by V=(V$_1$, V$_2$) through two H$^H$H eigenvectors depending on the two subchannels. Likewise, the matrix U of the SVD spatial decoder 92 can be configured by U=(U$_1$, U$_2$) through two H$^H$H eigenvectors.

Accordingly, in the SVD based SM MIMO system provided with beamforming antenna groups in accordance with one embodiment of the present invention, the dimension of the spatial encoding matrix V for coding performed by the spatial encoder 86 is configured by M×2 depending on the number of beamforming antenna groups and the number of subchannels which are used. This enables the dimension of the spatial encoding matrix to be more simplified than that configured by M×n depending on the number n of antennas constituting each beamforming antenna group in the SM MIMO system according to the related art.

In the mean time, the spatial encoder 86 in FIG. 9 serves as a precoder in the MIMO system. The precoder includes a matrix W for preceding. In order to split a data block into a plurality of data streams, matrix dimensions equivalent to the number of data streams are required. The precoding matrix W of the precoder that can be used in the SVD based MIMO system according to one embodiment of the present invention has a dimension of antenna ports P×data streams υ. Accordingly, the precoding matrix equivalent to the number of antennas according to the related art can be simplified as much as the number of antenna ports.

Hereinafter, precoding performed by the precoder in the SM MIMO system will be described in brief.

In general, supposing that data streams input to the precoder are x$_i$ and output streams after preceding are y$_i$, the relation such as Equation 6 is obtained.

$$\begin{bmatrix} y^{(0)}(i) \\ \ldots \\ y^{(P-1)}(i) \end{bmatrix} = W(i) \begin{bmatrix} x^{(0)}(i) \\ \ldots \\ x^{(\upsilon-1)}(i) \end{bmatrix} \quad \text{[Equation 6]}$$

In the above Equation 6, no cyclic shift diversity (CSD) exists. In this case, i represents subcarrier index, P represents a spatial multiplexing antenna group number, and υ represents a number of data streams.

If delay occurs in a frequency domain due to CSD, precoding such as Equation 7 is performed.

$$\begin{bmatrix} y^{(0)}(i) \\ \ldots \\ y^{(P-1)}(i) \end{bmatrix} = W(i)C(i) \begin{bmatrix} x^{(0)}(i) \\ \ldots \\ x^{(\upsilon-1)}(i) \end{bmatrix} \quad \text{[Equation 7]}$$

In the Equation 7, C(i) is additionally provided by precoding depending on cyclic shift diversity to a diagonal matrix.

In the Equation 6 and the Equation 7, a rank size of the precoding matrix W is antenna groups P×data streams υ and is more simplified than that of the related art, which is determined as much as the number of antennas.

Respective elements constituting the precoding matrix W in the SM MIMO system can be expressed by Equation 8. The Equation 8 illustrates that the precoding matrix W is expressed by a unit matrix of P×υ dimension by a rotational angle group.

$$\prod_{i=1}^{min(P-1,v)} \left[ D_i(1_{i-1} e^{j\phi_{i,i}} \ldots e^{j\phi_{P-1,i}} 1) \prod_{l=i+1}^{P} G_{li}^{T}(\psi_{li}) \right] \tilde{I}_{P\times \upsilon} \quad \text{[Equation 8]}$$

In the Equation 8, D is a diagonal matrix and is expressed by Equation 9.

$$D_i(1_{i-1} e^{j\phi_{i,i}} \ldots e^{j\phi_{P-1,i}} 1) = \begin{bmatrix} I_{i-1} & 0 & 0 & \ldots & 0 \\ 0 & e^{j\phi_{i,j}} & \ldots & \ldots & 0 \\ 0 & 0 & \ldots & 0 & 0 \\ \ldots & \ldots & 0 & e^{j\phi_{P-1,j}} & 0 \\ 0 & 0 & \ldots & 0 & 1 \end{bmatrix} \quad \text{[Equation 9]}$$

In the Equation 9, is a unit identity matrix of (i−1)×(i−1) dimension.

In the Equation 8, G$_{li}^T$(ψ$_{li}$) is a rotation matrix of P×P dimension and can be expressed by Equation 10.

$$G_{li}^{T}(\psi_{li}) = \begin{bmatrix} I_{i-1} & 0 & 0 & 0 & 0 \\ 0 & \cos(\psi_{li}) & 0 & \sin(\psi_{li}) & 0 \\ 0 & 0 & I_{l-i-1} & 0 & 0 \\ 0 & -\sin(\psi_{li}) & 0 & \cos(\psi_{li}) & 0 \\ 0 & 0 & 0 & 0 & I_{P-l} \end{bmatrix} \quad \text{[Equation 10]}$$

In the Equation 10, each I$_m$ is an identity matrix of m×m dimension.

In the Equation 8, $\tilde{I}_{P\times \upsilon}$ matrix represents an identity matrix for adding columns or rows of 0 to configure a square matrix when the dimension of the precoding matrix is P≈υ.

In order to configure the precoding matrix defined by the above Equation 8, a feedback angle can be aligned as illustrated in Table 1 if feedback information is received from the receiving device.

TABLE 1

| Data streams | The number of sub-channels | The number of angles | The order of feedback angles | The number of bits |
|---|---|---|---|---|
| 2 | 2 | 2 | $\Phi_{11}, \Psi_{21}$ | 10 |
| 2 | 3 | 6 | $\Phi_{11}, \Phi_{21}, \Psi_{21}, \Psi_{31}, \Phi_{22}, \Psi_{32}$ | 30 |
| 3 | 3 | 6 | $\Phi_{11}, \Phi_{21}, \Psi_{21}, \Psi_{31}, \Phi_{22}, \Psi_{32}$ | 30 |
| 2 | 4 | 10 | $\Phi_{11}, \Phi_{21}, \Phi_{31}, \Psi_{21}, \Psi_{31}, \Psi_{41}, \Phi_{22}, \Phi_{32}, \Psi_{32}, \Psi_{42}$ | 50 |
| 3 | 4 | 12 | $\Phi_{11}, \Phi_{21}, \Phi_{31}, \Psi_{21}, \Psi_{31}, \Psi_{41}, \Phi_{22}, \Phi_{32}, \Psi_{32}, \Psi_{42}, \Phi_{33}, \Psi_{43}$ | 60 |
| 4 | 4 | 12 | $\Phi_{11}, \Phi_{21}, \Phi_{31}, \Psi_{21}, \Psi_{31}, \Psi_{41}, \Phi_{22}, \Phi_{32}, \Psi_{32}, \Psi_{42}, \Phi_{33}, \Psi_{43}$ | 60 |

Referring to Table 1, if the SM MIMO system according to one embodiment of the present invention is implemented to use two mutual independent subchannels, a beam pattern for feedback can be implemented two-dimensionally, and two types of angles $\Phi_{11}$ and $\Psi_{21}$ can be required.

The angle $\Phi$ can be expressed by a quantized equation of 6 bits, for example, as expressed by Equation 11.

$$\Phi = k\pi/32 + \pi/64 \quad \text{[Equation 11]}$$

In this Equation 11, k represents a number of data streams and k=0, 1, ..., 63.

The angle $\Psi$ can be expressed by a quantized equation of 4 bits, as expressed by Equation 12.

$$\Psi = k\pi/8 + \pi/16 \quad \text{[Equation 12]}$$

Likewise, in this Equation 12, k represents a number of data streams and k=0, 1, ..., 15.

If the transmitting device has information on the channel matrix H and transmits input symbols, which are split into K parallel bit streams, to the SVD spatial encoder 86, the number of the bit streams are varied depending on the number of ranks of the channel matrix H and does not exceed a minimum value of the number of antenna groups of the transmitting device or the receiving device (in this case, K≤min{M,N}).

Referring to FIG. 9 again, the SM MIMO devices according to one embodiment of the present invention use the beamforming technology by using at least one or more beamformers 89 and 90. A beam pattern for transmitting data packets using directional signals through antennas included in one or more beamforming antenna groups will be described with reference to FIG. 10 to FIG. 12.

Each of the beamformers 89 and 90 of the transmitting device and the receiving device, as illustrated in FIG. 10, includes four half-wavelength oscillators, and a beamforming pattern in each of the beamformers can be formed in a radial direction. Hereinafter, the beamforming pattern will be described in brief with reference to FIG. 10.

FIG. 10 is a diagram illustrating an example of a beforming pattern in a beamformer of an SVD based SM MIMO system according to one embodiment of the present invention.

(a) of FIG. 10 illustrates an example that a beamformer according to one embodiment of the present invention directs a radio wave along an axis z on three-dimensions x, y, z. In this case, a direction of the beam pattern can be expressed by Equation 13.

$$F(\theta) = \frac{\cos(0.5\pi\cos\theta)}{\sin\theta} \quad \text{[Equation 13]}$$

(b) of FIG. 10 illustrates the beam pattern based on the Equation 13 on a plane.

Supposing that the oscillators of the beamformers 89 and 90 are located on one surface of a metal reflecting plate at the distance of 0.25λ, the metal surface has a value of 0 on the axis y. In this case, the beam pattern through the oscillators can be expressed by Equation 14.

$$F_1(\theta) = \frac{\cos(0.5\pi\cos\theta)}{\sin\theta} \times 2\sin(0.5\pi\sin\theta\sin\varphi) \quad \text{[Equation 14]}$$

In the Equation 14, 2 sin(0.5π sin θ sin φ) represents that the beam pattern is affected by the metal reflecting surface.

Figure 11:
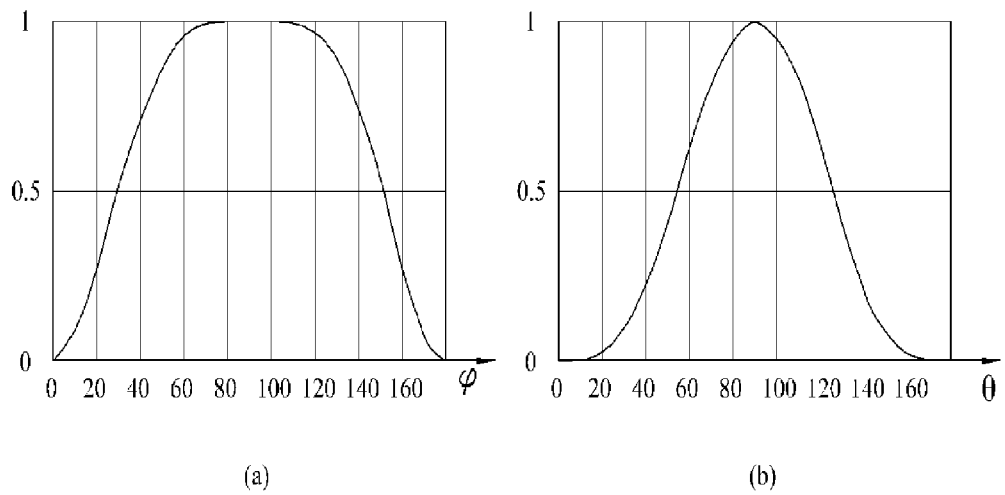
FIG. 11 is a diagram illustrating another example of a beforming pattern in a beamformer of an SVD based SM MIMO system according to one embodiment of the present invention.

FIG. 11 is a diagram illustrating another example of a beforming pattern in a beamformer of an SVD based SM MIMO system according to one embodiment of the present invention.

(a) of FIG. 11 illustrates a beam pattern on a horizontal plane in a state that the beam pattern in (a) of FIG. 10 maintains a phase of 90° with the axis z, wherein a beamwidth of an antenna radial angle is 120°. (b) of FIG. 11 illustrates a beam pattern on a vertical plane in a state that the beam pattern in (a) of FIG. 10 maintains a phase of 90° with the axis x, wherein a beamwidth of an antenna radial angle is 72°.

Referring to FIG. 10 again, supposing that four oscillator arrays are used to form one beamformer, the respective oscillators have the same magnitude and phase. In this case, the center of the first oscillator is located on a coordinate ($x_1=-0.25\lambda$, $y_1=0.25\lambda$, $z_1=-0.25\lambda$), the center of the second oscillator is located on a coordinate ($x_2=-0.25\lambda$, $y_2=0.25\lambda$, $z_2=0.25\lambda$), the center of the third oscillator is located on a coordinate ($x_3=0.25\lambda$, $y_3=0.25\lambda$, $z_3=-0.25\lambda$), and the center of the fourth oscillator is located on a coordinate ($x_4=0.25\lambda$, $y_4=0.25\lambda$, $z_4=0.25\lambda$). Then, the beam patterns occurring through the four oscillators can be synthesized as expressed by Equation 15.

$$F_2(\theta) = \frac{\cos(0.5\pi\cos\theta)}{\sin\theta} \times 2\sin(0.5\pi\sin\theta\sin\varphi) \times 2\cos(0.5\pi\sin\theta\cos\varphi) \times 2\cos(0.5\pi\cos\theta) \quad \text{[Equation 15]}$$

In the Equation 15, 2 cos(0.5π sin θ cos φ) represents an oscillator array element on a horizontal plane, and 2 cos(0.5π cos θ) represents an oscillator array element on a vertical plane.

Figure 12:
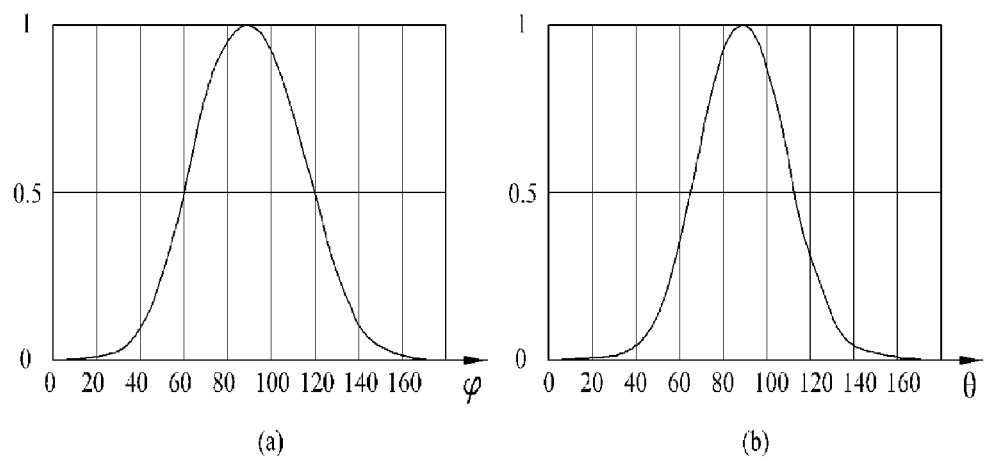
FIG. 12 is a diagram illustrating other example of a beforming pattern in a beamformer of an SVD based SM MIMO system according to one embodiment of the present invention.

The oscillator array pattern that includes the four oscillators on the horizontal plane and the vertical plane are illustrated in FIG. 12.

FIG. 12 is a diagram illustrating other example of a beforming pattern in a beamformer of an SVD based SM MIMO system according to one embodiment of the present invention.

(a) of FIG. 12 illustrates a beam pattern on a horizontal plane in a state that the beam pattern in (a) of FIG. 10 maintains a phase of 90° with the axis z, wherein a beamwidth of an antenna radial angle is 60°. (b) of FIG. 12 illustrates a beam pattern on a vertical plane in a state that the beam pattern in (a) of FIG. 10 maintains a phase of 90° with the axis x, wherein a beamwidth of an antenna radial angle is 47°.

As described with reference to FIG. 10 to FIG. 12, if the signals are transmitted and received in accordance with the beam pattern occurring in the beamformer of the SM MIMO device according to one embodiment of the present invention, two minimum subchannels are maintained and at the same time a maximum signal to noise ratio can be obtained.

Before beamforming is performed between the SM MIMO transmitting device and the SM MIMO receiving device, which include a plurality of beamforming antenna groups as illustrated in FIG. 9, a beam searching process should be performed. Beam searching means a process for selecting one or more beamforming antenna groups which will be used for signal transmission and reception between the devices.

Figure 13:
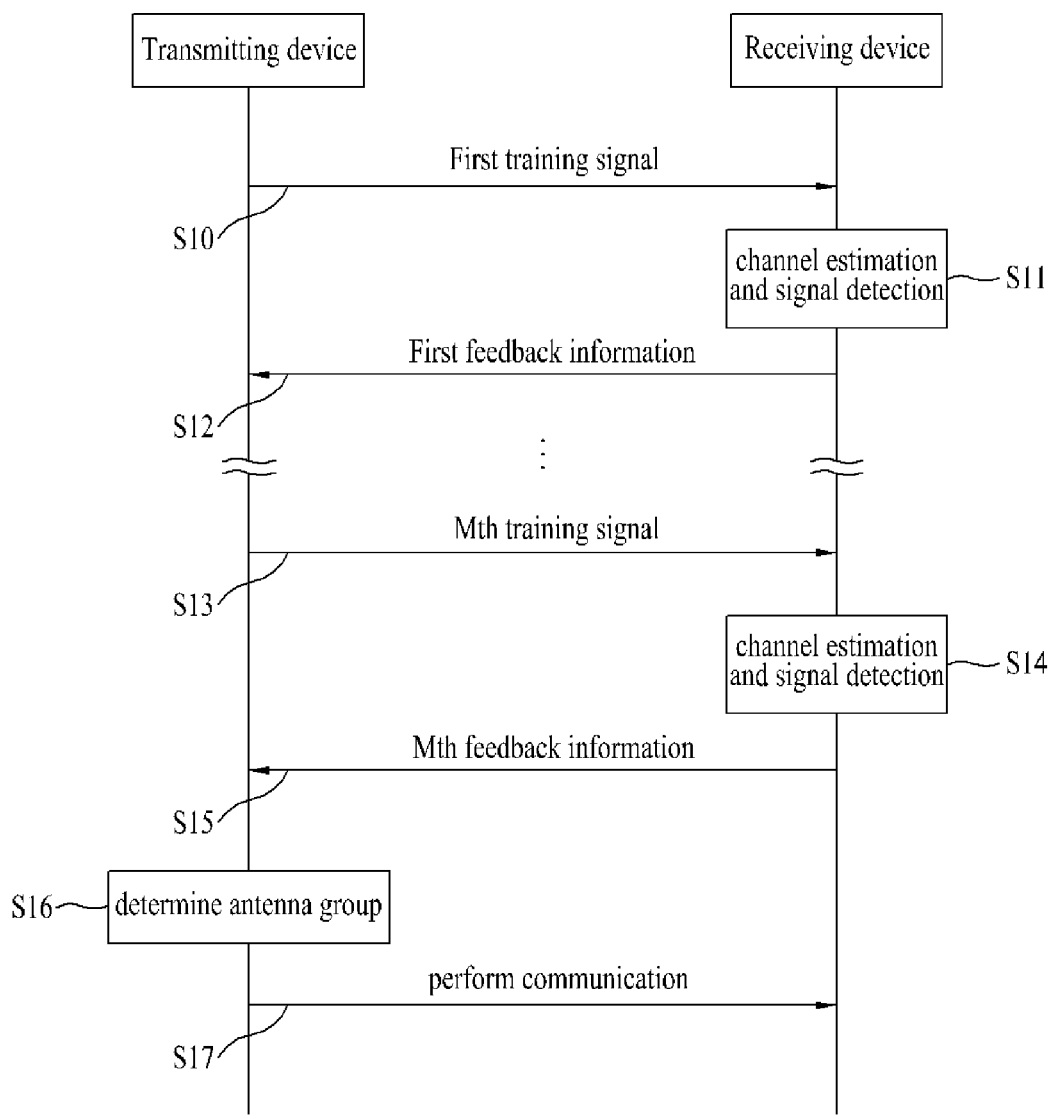
FIG. 13 is a flow chart illustrating an example of a procedure of transmitting and receiving a signal for beamsearching between SVD based SM MIMO devices according to one embodiment of the present invention.

FIG. 13 is a flow chart illustrating an example of a procedure of transmitting and receiving a signal for beam searching between SVD based SM MIMO devices according to one embodiment of the present invention. Beam searching is not necessarily required for initial communication, and may be carried out in the middle of communication if necessary. Also, beam searching includes beam searching in HRP channel and beam searching in LRP channel.

Referring to FIG. 13, the transmitting device according to one embodiment of the present invention transmits a training signal to the receiving device through each antenna group (S10). The receiving device performs channel estimation and signal detection through the training signal (S11). In the embodiment illustrated in FIG. 9, channel estimation is performed in such a way to estimate the channel matrix H, which includes channel coefficient $h_{mn}$ of m×N channel in a (M×N×n) SM MIMO system that includes a transmitting device provided with M beamformers and a receiving device provided with N beamformers. The receiving device transmits feedback information based on the channel estimation and signal detection to the transmitting device (S12).

At this time, it is preferable that the training signals transmitted from the plurality of beamforming antenna groups of the transmitting device are transmitted in due order as illustrated in FIG. 10. In other words, after the first training signal is transmitted through the first beamforming antenna group, the second training signal is transmitted through the second antenna group. In this way, the training signals are transmitted in due order from the beamforming antenna groups. Also, the training signals may be transmitted through one or more beamforming antenna groups with a predetermined time interval. It is preferable that process steps of transmitting feedback information from the receiving device to the transmitting device are performed in due order in accordance with the training signals transmitted from the transmitting device. In this way, the training signals and feedback information thereof may be repeated for throughput detection for each of the beamforming antenna groups, and at the same time may be repeated several times to measure ranks of the channel matrix H (S13, S14, S15).

After the above steps are repeated, the transmitting device determines one or more beamforming antenna groups through the feedback information (S16). The transmitting device can select an optimized antenna group from the beamforming antenna groups having throughput of a predetermined reference value or more based on the detected result.

Also, the feedback information transmitted from the receiving device may include strength information of the signal received as a result of signal detection in the step S11 or S14. Accordingly, the transmitting device may select a beamforming antenna group which will be used and may also determine an antenna array weight vector (AWV) which will be applied to the selected beamforming antenna group.

The AWV is determined based on the strength information of the received signal between the transmitting device and the receiving device, which perform beamforming. The receiving device according to one embodiment of the present invention may transmit the feedback information, which includes the AWV information obtained during signal detection in the step S11 or S14, to the transmitting device. Alternatively, the transmitting device according to one embodiment of the present invention may determine the AWV in the step S16 based on the strength information of the received signal included in the feedback information. The transmitting device transmits the information on the determined beamforming antenna group to the receiving device and performs communication by using the corresponding antenna group (S17).

In the mean time, unlike FIG. 13, the receiving device may directly transmit information indicating available beamforming antenna groups or antennas to the transmitting device in the step S12 or S15 of transmitting the feedback information. For example, if the receiving device selects the optimized beamforming antenna group through signal detection, it may directly notify the transmitting device of index information allocated to the corresponding beamforming antenna group. In this way, if the receiving device directly transmits information indicating beamforming antenna group, the number of transmission times of the training signals and their feedback information can be reduced, and the amount of the feedback information can also be reduced.

At this time, the training signals transmitted from the transmitting device are based on previously set training sequences shared between the transmitting device and the receiving device, and may include identification information on the transmitting device as the case may be.

Examples of the sequences for the training sequences include orthogonal code sequences, pseudo noise (PN) sequences, Hadamard code sequences, and CAZAC sequences. An example of a data format that includes training sequences will be described with reference to FIG. 14 and FIG. 15.

Figure 14:
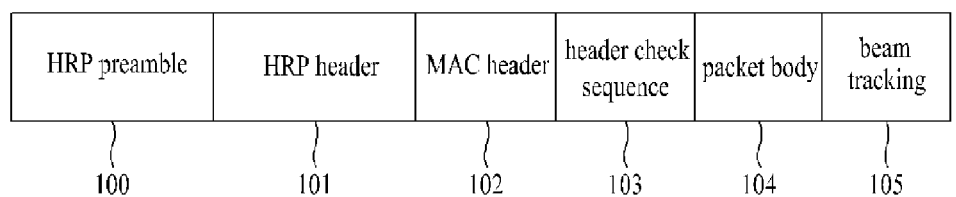
FIG. 14 is a diagram illustrating an example of data packets transmitted from an SVD based SM MIMO transmitting device according to one embodiment of the present invention.

FIG. 14 is a diagram illustrating an example of data packets transmitted from an SVD based SM MIMO transmitting device according to one embodiment of the present invention. The training signals according to one embodiment of the present invention are transmitted in the form of data packets illustrated in FIG. 14. Hereinafter, an example of training signal data packets will be described.

Referring to FIG. 14, data packets that include training sequences transmitted between the devices in the SM MIMO system can be transmitted in the format of HRPDU (High-Rate Protocol Data Unit) packet. Examples of the HRPDU packet include an HRP preamble 100, an HRP header 101, a MAC header 102, a header check sequence (HCS) 103, a packet body 104 consist of at least one or more subpackets, and a field 105 allocated for beam tracking.

The training signal packets of the HRPDU format used in the SM MIMO system are allocated in such a manner that 14 HRP preamble symbols not 8 symbols are commonly allocated to the HRP preamble 100.

First of all, first four HRP preamble symbols are time domain preambles and are derived from m sequences re-sampled 1.5 times. The m sequences are generated as an octic polynomial expression as expressed by Equation 16.

$$x^8+x^7+x^2+x+1 \qquad \text{[Equation 16]}$$

The time domain preamble occupies a size of a time interval corresponding to four OFDM symbols by resampling one sequence that includes m sequences repeated five times, is accompanied with coded m sequences, and the other space is filled with 0.

Next, 5~14 symbols are frequency domain symbols, and before the symbols are converted to time domain samples, 5, 6, 7, 8, and 11 symbols are multiplied by a value of +1, whereas 9, 10, 13 and 14 symbols are multiplied by a value of −1. The time domain samples can be obtained by 512 IFFT conversion of the corresponding frequency domain value.

Figure 15:
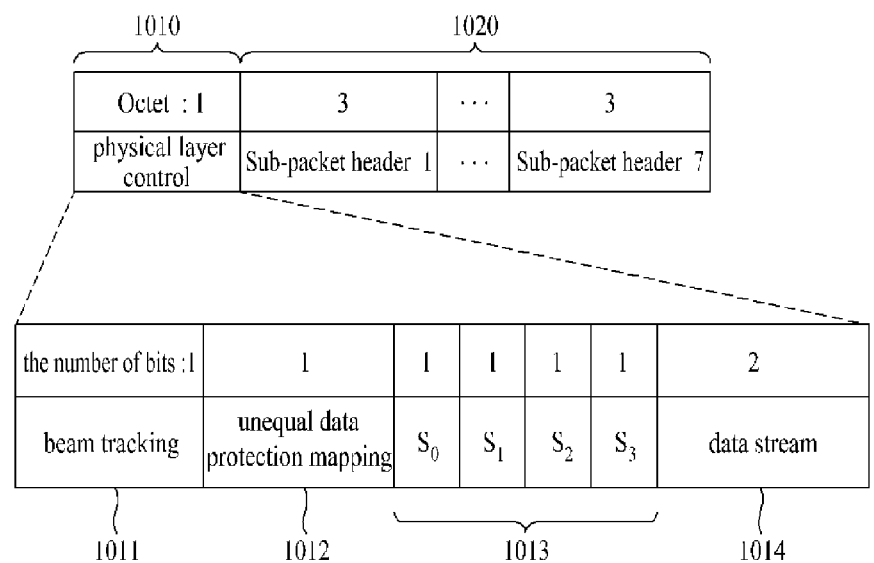
FIG. 15 is a diagram illustrating an example of an HRP header format included in a data packet transmitted from the SVD based SM MIMO transmitting device according to one embodiment of the present invention.

Next, the HRP header 101 according to one embodiment of the present invention can be configured as illustrated in FIG. 15.

FIG. 15 is a diagram illustrating an example of an HRP header format included in a data packet transmitted from the SVD based SM MIMO transmitting device according to one embodiment of the present invention. A format of the HRP header of training signals that include training sequences according to one embodiment of the present invention is also configured as illustrated in FIG. 15.

Referring to FIG. 15, the HRP header 101 includes a PHY control field 1010 and a packet header body 1020 that includes at least one or more sub-packet headers. The PHY control field 1010 includes a beam tracking field 1011, an unequal error protection (UEP) mapping field 1012, a field 1013 for initial values $S_0$, $S_1$, $S_2$, $S_3$ of a scrambler that performs scrambling, and a data stream field 1014.

It is supposed that 1 bit is allocated to the beam tracking field 1011. In this case, if a training signal for beam tracking is added to the data packet, the beam tracking field 1011 is set to 1. If not so, the beam tracking field 1011 is set to 0.

The beam tracking field 1011 and the UEP mapping field 1012 may include various kinds of information if bits allocated thereto are increased. If 1 bit is currently allocated to the beam tracking field 1011 or the UEP mapping field 1012, the corresponding field can be set to 1 or 0.

The data stream field 1014 is used for spatial multiplexing according to one embodiment of the present invention, and can be allocated with 2 bits. If bits allocated to the data stream field 1014 are smaller than the number of data streams existing in the packet, the data stream field 1014 is set to 1. In this case, the same bits may be set to the PHY control field 1010 of each spatial stream. If spatial multiplexing is not used, the data stream field 1014 can be set to 0. Likewise, if the bits allocated to the data stream field 1014 are increased, the data stream field 1014 may include various kinds of information. If 1 bit is currently allocated to the data stream field 1014, the corresponding field can be set to 1 or 0.

Next, an example of a data packet that includes feedback information transmitted from the SM MIMO receiving device according to one embodiment of the present invention will be described with reference to FIG. 16 and FIG. 17. In more detail, information illustrated in FIG. 16 and FIG. 17 illustrates an example of feedback information that includes information on antenna array weight vector.

Since beamforming includes omni-directional beamforming or uni-directional beamforming, the feedback data packet transmitted during the beam searching process can be divided into omni-directional data packet and uni-directional data packet.

FIG. 16 is a diagram illustrating an example of a feedback data format transmitted from an SVD based SM MIMO receiving device according to one embodiment of the present invention. In more detail, FIG. 16 illustrates an example of a payload format of a feedback packet transmitted during an omni-directional beam searching process.

Referring to FIG. 16, the omni-directional beam searching feedback packet includes a TX gain selection field 110 that includes information requesting control of transmission power of the transmitting device while beam searching is being performed, a reserved field 111, a Tx AWV feedback information field 112 that includes AWV feedback information of the transmitting device, and a Tx AWV index field 113 that includes AWV index information of the transmitting device.

The Tx gain selection field 110 includes indication information for controlling beamforming gain by controlling the transmission power of the transmitting device based on strength of the received signal while the beam searching process is being performed.

Since the AWV is a weight vector that includes a synthetic value of phase and magnitude of a beam pattern corresponding to each antenna group, the Tx AWV feedback information field 112 includes sequence indicating information on the AWV.

FIG. 17 is a diagram illustrating another example of a feedback data format transmitted from the SVD based SM MIMO receiving device according to one embodiment of the present invention. In more detail, FIG. 17 illustrates an example of a payload format of a feedback packet transmitted during a uni-directional beam searching process.

Referring to FIG. 17, the uni-directional beam searching feedback packet includes a reserved field 120, a TX AWV feedback information field 121, a Tx AWV index information field 122, and a cyclic redundancy check (CRC) bit field 123.

The data packet that includes the training sequence is transmitted in accordance with the HRP mode, and the feedback information is transmitted in accordance with the LRP mode. However, the transmission modes of the data packet and the feedback information are not limited to the above modes.

Although the aforementioned beam searching process for selecting an optimized beamforming antenna group may be performed by the MAC layer of the WVAN transmitting device, a beam searching process for changing to new HRP or beamforming LRP link if a link status through the beamforming antenna group currently served by the WVAN receiving device is not good may be requested to the transmitting device. In this case, a beam searching request message may be included in ACK/NACK signal for data received from the transmitting device.

In the mean time, if a rank of a channel matrix used in the beamforming antenna system is 1 or less than 1, the current system may be regarded as a SISO system. In this case, general beam searching and beamforming are performed, and a beam searching process for spatial multiplexing (SM) is not performed. However, if the rank of the channel matrix is greater than 1, beamforming is performed to form N spatial streams, wherein N is the same as a minimum number of ranks H of the channel matrix. In other words, if the channel rank is greater than 1, the SM MIMO device according to one embodiment of the present invention performs spatial multiplexing precoding for data streams for transmission. In FIG. 9, the SVD spatial coder or separate precoder performs precoding for the data streams by using a spatial multiplexing precoding matrix.

The SVD based SM MIMO device according to one embodiment of the present invention can obtain the spatial multiplexing precoding matrix by transmitting and receiving training sequences for spatial multiplexing and feedback information based on the training sequences. Hereinafter, an example of a beam searching process for spatial multiplexing will be described with reference to FIG. 18.

Figure 18:
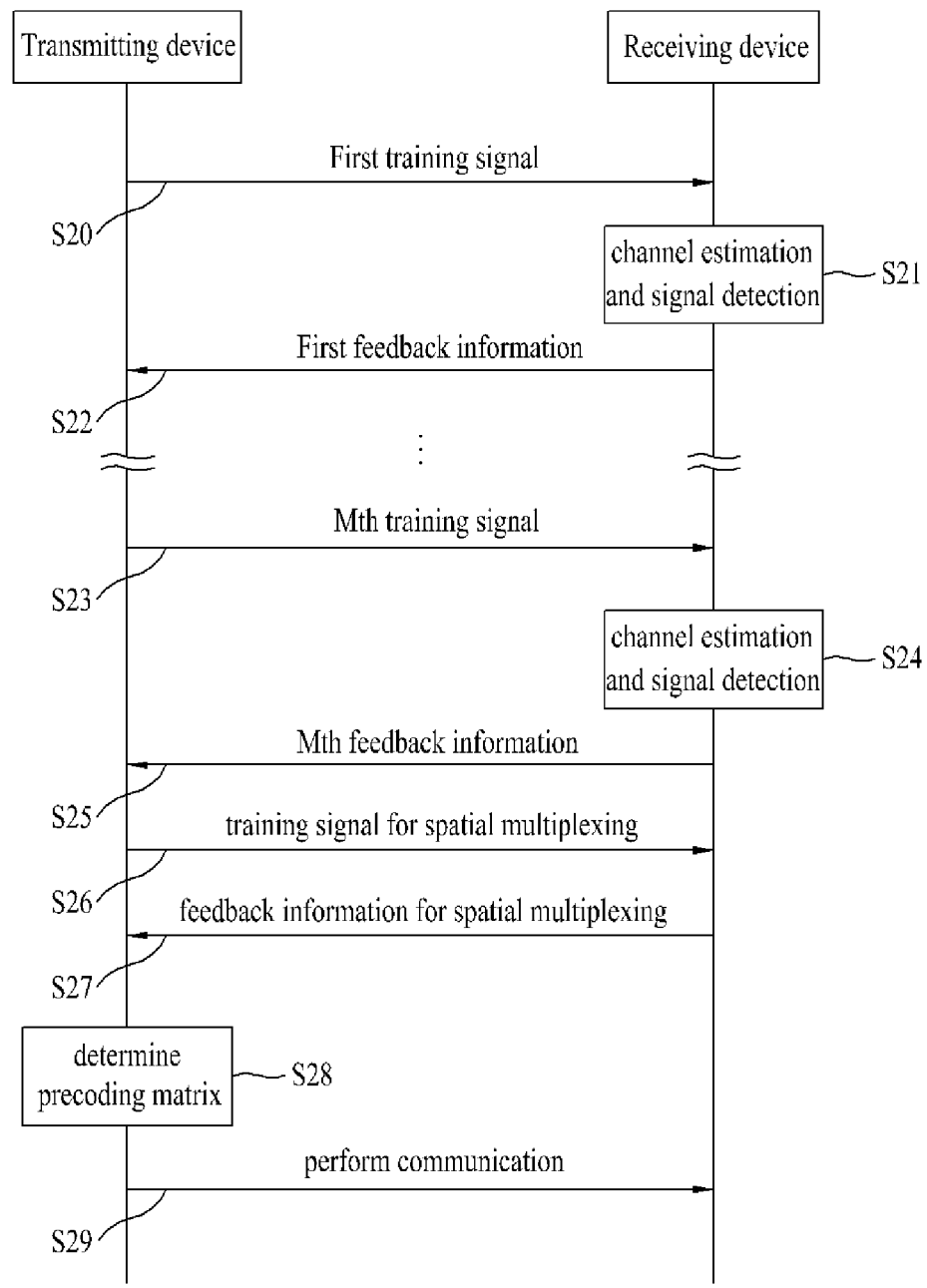
FIG. 18 is a flow chart illustrating an example of a procedure of transmitting and receiving a signal for precoding for spatial multiplexing between SVD based SM MIMO devices according to one embodiment of the present invention.

FIG. 18 is a flow chart illustrating an example of a procedure of transmitting and receiving a signal for precoding for spatial multiplexing between SVD based SM MIMO devices according to one embodiment of the present invention.

Referring to FIG. 18, the transmission procedure (S20-S25) of the training signals and the feedback information are corresponding to the procedure of steps S10-S15 of FIG. 10. Accordingly, descriptions of the same procedure are omitted.

The transmitting device according to one embodiment of the present invention transmits a training signal for obtaining a spatial multiplexing precoding matrix to the receiving device after performing the beam searching process (S26). The receiving device transmits spatial multiplexing feedback information corresponding to the training signal to the transmitting device (S27). The spatial multiplexing feedback information includes precoding matrix size control information for controlling the size of the precoding matrix depending on the minimum channel matrix rank based on maximum data streams for transmission, together with the omni-directional or uni-directional feedback information.

The transmitting device that has received the feedback information determines the precoding matrix based on the precoding matrix size control information through the spatial multiplexing feedback information (S28). And, the transmitting device performs precoding to data for transmission by using the determined precoding matrix and then transmits the precoded data to the receiving device (S29), thereby performing communication with the receiving device.

The spatial multiplexing training signal includes at least one or more training sequences. Examples of the spatial multiplexing beam searching training sequence include different PN sequences, Hadamard code sequences, orthogonal code sequences, and CAZAC sequences for each of the spatial multiplexing antenna port and the transmitting device AWV. Also, the data packet that includes training sequences can be transmitted in the same manner as the example of the data packet illustrated in FIG. 14 and FIG. 15.

The training sequence for spatial multiplexing is a training sequence for each beamforming antenna group. Different training sequences can be provided for different antenna groups for spatial multiplexing.

The spatial multiplexing feedback information can be transmitted through short-omni LRP packets in the LRP mode. Hereinafter, the spatial multiplexing feedback information will be described with reference to FIG. 19.

FIG. 19 is a diagram illustrating other example of a feedback data format transmitted from the SVD based SM MIMO receiving device according to one embodiment of the present invention. In more detail, FIG. 19 illustrates an example of a payload format of a feedback packet transmitted during a short-omni beam searching process.

Referring to FIG. 19, the feedback packet includes a stream number field 130 that includes information on a stream number, a port number field 131 that includes information on a beamforming antenna port, a subcarrier order information that includes information on subcarrier order, a receiving strength field 133 that includes information on strength of the received signal, a precoding angle field 134 that includes information on angles of vectors constituting the precoding matrix, a CRC bit field 135 that includes CRC bit for CRC, and a stuff bit field 136 that includes stuff bits such that the bits constituting data packets configure octet of integers.

The stream number field 130 and the port number field 131 include information on a stream currently in service and information on a number smaller than a number of an antenna port, respectively.

The result obtained by multiplying the subcarrier order included in the subcarrier order field 132 by two is the same as the number of subcarriers per precoding matrix.

The receiving strength field 133 includes information on relative signal strength of the (k+1)th data stream to the kth data stream. In the example of FIG. 19, the value of k is set, but not limited to, 1, 2, and 3.

The precoding angle field 134 indicates angle information included in the precoding matrix by using predetermined bits in a precoding angle group unit.

In FIG. 19, since fixed bits are not allocated to the receiving strength field 133, the precoding angle field 134 and the stuff bit field 135, various bits may be allocated thereto depending on embodiments.

The size of the feedback data format and the number of transmission times of the feedback information are determined depending on the number of antenna groups or ports in the SM MIMO system and the number of maximum antennas that can be included in one antenna group.

The feedback information for spatial multiplexing can be determined depending on the beamforming antenna group and the number of maximum antennas for one antenna group. AN example of the feedback packet for spatial multiplexing can be configured by 72 bits or 144 bits. Also, the feedback packet is not limited to the feedback packet illustrated in FIG. 19 and may include a feedback information field that includes feedback information on the transmitting device antenna array weight vector (AWV) and a Tx device index information field, like the aforementioned beam searching feedback packet.

Since the size of AWV feedback for beam searching, the number of beamforming antenna groups P of the transmitting device×the number of maximum antennas Q that can be included in one antenna group, cannot exceed 72, maximum 72 bits or 144 bits can be used as the AWV feedback bits N.

Table 2 illustrates information on the number of maximum antennas that can be included in one beamforming antenna group of the SM MIMO device that includes a plurality of beamforming antenna groups, wherein 72 bits are used as feedback bits.

TABLE 2

| The number of feedback bits | The number of spatial multiplexing ports | AWV format | The number of maximum antennas in port unit | The order of AWV bits |
|---|---|---|---|---|
| 72 | 2 | P2 | 18 | 18 (Port 1), 18 (Port 2) |
|  |  | P3 | 12 | 12 (Port 1), 12 (Port 2) |
|  |  | P4 | 9 | 9 (Port 1), 9 (Port 2) |
|  |  | P3M3 | 6 | 6 (Port 1), 6 (Port 2) |
|  | 3 | P2 | 12 | 12 (Port 1), 12 (Port 2), 12 (Port 3) |
|  |  | P3 | 8 | 8 (Port 1), 8 (Port 2), 8 (Port 3) |
|  |  | P4 | 6 | 6 (Port 1), 6 (Port 2), 6 (Port 3) |
|  |  | P3M3 | 4 | 4 (Port 1), 4 (Port 2), 4 (Port 3) |
|  | 4 | P2 | 9 | 9 (Port 1), 9 (Port 2), 9 (Port 3), 9 (Port 4) |
|  |  | P3 | 6 | 6 (Port 1), 6 (Port 2), 6 (Port 3), 6 (Port 4) |
|  |  | P4 | 4 | 4 (Port 1), 2 (Zero bit), 4 (Port 2), 2 (Zero bit), 4 (Port 3), 2 (Zero bit), 4 (Port 4), 2 (Zero bit) |
|  |  | P3M3 | 3 | 3 (Port 1), 3 (Port 2), 3 (Port 3), 3 (Port 4) |

Next, Table 3 illustrates information on the number of maximum antennas that can be included in one beamforming antenna group when feedback bits are 144 bits.

TABLE 3

| The number of feedback bits | The number of spatial multiplexing ports | AWV format | The number of maximum antennas in port unit | The order of AWV bits |
|---|---|---|---|---|
| 144 | 2 | P2 | 36 | 36 (Port 1), 36 (Port 2) |
|  |  | P3 | 24 | 24 (Port 1), 24 (Port 2) |
|  |  | P4 | 18 | 18 (Port 1), 18 (Port 2) |
|  |  | P3M3 | 12 | 12 (Port 1), 12 (Port 2) |
|  | 3 | P2 | 24 | 24 (Port 1), 24 (Port 2), 24 (Port 3) |
|  |  | P3 | 16 | 16 (Port 1), 16 (Port 2), 16 (Port 3) |
|  |  | P4 | 12 | 12 (Port 1), 12 (Port 2), 12 (Port 3) |
|  |  | P3M3 | 8 | 8 (Port 1), 8 (Port 2), 8 (Port 3) |
|  | 4 | P2 | 18 | 18 (Port 1), 18 (Port 2), 18 (Port 3), 18 (Port 4) |
|  |  | P3 | 12 | 12 (Port 1), 12 (Port 2), 12 (Port 3), 12 (Port 4) |
|  |  | P4 | 9 | 9 (Port 1), 9 (Port 2), 9 (Port 3), 9 (Port 4) |
|  |  | P3M3 | 6 | 6 (Port 1), 6 (Port 2), 6 (Port 3), 6 (Port4) |

Referring Table 2 and Table 3, the number of antenna groups (or antenna ports) used in the SM MIMO system can be reduced to reach minimum 2. The SM MIMO system according to one embodiment of the present invention is implemented to configure two minimum subchannels through the SVD encoder illustrated in FIG. 9, whereby the number of beamforming antenna groups can be reduced to reach minimum two, and feedback information and the number of transmission times of the feedback information can be reduced correspondingly.

In the mean time, in another example of the SM MIMO device provided with a plurality of beamforming antenna groups according to one embodiment of the present invention, MIMO postamble may be used, whereby the procedure of transmitting and receiving feedback information for optimized antenna groups selection may be omitted.

The MIMO postamble is transmitted simultaneously from all beamforming antenna groups or beamformers in a non-MIMO system, and is the same as or similar to the training signal. Accordingly, the signal included in the MIMO postamble should be split from the signal broadcasted through each beamformer of the receiving device. To this end, Walsh sequence can be used.

The Walsh sequence has a length of $L_W=2^p$, wherein p=1, 2, 3, .... Each transport beamformer should use its separate Walsh sequence, and the length L of the MIMO postamble should be the same as or greater than the number M of transport beamformers. For example, if the number of transport beamformers is 6 or 8, $L_W=8$, and the MIMO postamble includes eight OFDM symbols as expressed by Equation 17 below.

$$W_g = \begin{pmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & -1 & -1 & -1 & -1 & -1 \\ 1 & -1 & 1 & 1 & -1 & 1 & -1 & 1 \\ 1 & 1 & -1 & 1 & -1 & -1 & 1 & 1 \\ 1 & -1 & -1 & -1 & -1 & 1 & 1 & -1 \end{pmatrix}$$ [Equation 17]

Rows and columns of the matrix expressed by the Equation 17 represent Walsh sequences having a length of $L_W=8$.

If the above postamble is used, the SVD MIMO system according to one embodiment of the present invention can perform channel estimation even without the procedure of transmitting feedback information.

Figure 20:
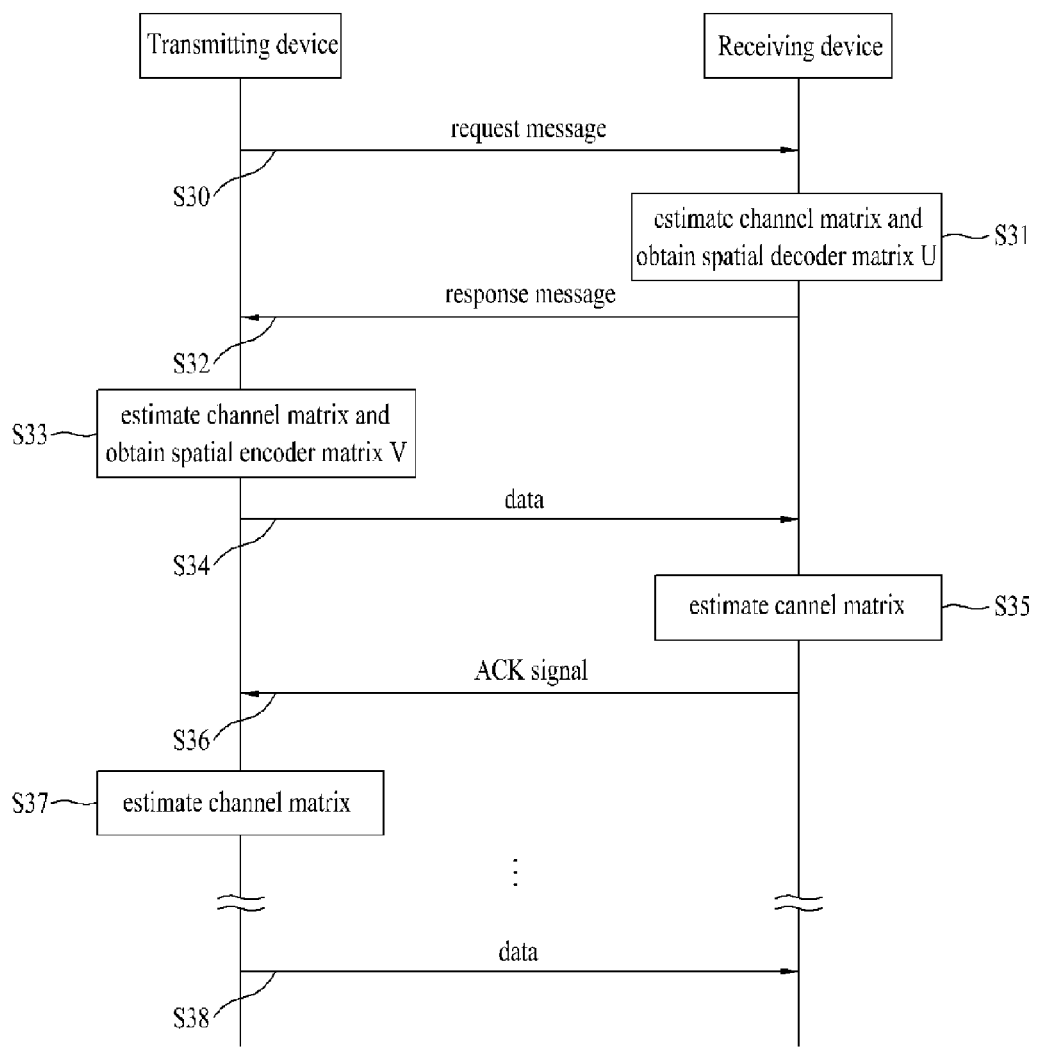
FIG. 20 is a flow chart illustrating an example of a procedure of transmitting and receiving a signal between SVD based SM MIMO devices according to one embodiment of the present invention.

FIG. 20 is a flow chart illustrating an example of a procedure of transmitting and receiving a signal between SVD based SM MIMO devices according to one embodiment of the present invention.

Preferably, the transmitting device and the receiving device include a plurality of beamforming antenna groups, and signals transmitted from each antenna group are transmitted in due order. Also, one or more beamforming antenna groups may transmit their signals in accordance with a predetermined time interval.

Referring to FIG. 20, the transmitting device transmits a request to send (RTS) packet to the receiving device to request channel estimation (S30). The first MIMO postamble is added to the rear of the RTS packet, and the RTS packet is transmitted in accordance with a non-MIMO mode. The receiving device that has received the RTS packet estimates a channel matrix $H_{1 \to 2}$ for the channel used for signal transmission from the transmitting device to the receiving device through the first MIMO postamble, and obtains a spatial decoder matrix U (S31). The spatial decoder matrix U can be obtained through the channel matrix as described above, and includes two matrix $H^H H$ eigenvectors of $U=(U_1, U_2)$. The receiving device transmits a clear to sender (CTS) packet to the transmitting device (S32). The second MIMO postamble is added to the rear of the CTS packet, and the CTS packet added with the second MIMO postamble is transmitted in accordance with the non-MIMO mode. Then, the transmitting device estimates a channel matrix $H_{2 \to 1}$ for the channel used for signal transmission from the receiving device to the transmitting device through the second MIMO postamble, and obtains a spatial encoder matrix V (S33). The spatial encoder matrix V includes two matrix $H^H H$ eigenvectors of $V=(V_1, V_2)$. In general, it is noted that $H_{1 \to 2}=H_{2 \to 1}$ for the channel matrix is obtained by the correlation of the spatial channels. Accordingly, $H_{1 \to 2}=H$ and $H_{2 \to 1}=H^H$ can be set.

Next, the transmitting device transmits the first data packet to the receiving device in accordance with the HRP SVD mode (S34). At this time, the data packet the same as that illustrated in FIG. 14 can be used. The third MIMO postamble is added to the lower end of the data block. The receiving device repeats estimation of the channel matrix through the third MIMO postamble (S35). The receiving device transmits ACK/NACK signal for the data block to the transmitting device (S36). Since the fourth MIMO postamble is added to the lower end of the ACK/NACK signal, the transmitting device can estimate the corresponding channel through the fourth MIMO postamble (S37). The steps S34 to S37 are repeated between the transmitting device and the receiving device. If the channel estimation is performed through repetition of the above steps, communication between the transmitting device and the receiving device is performed.

Through repetition of the steps illustrated in FIG. 20, the transmitting device and the receiving device can obtain channel information, and can form the SVD mode even without separate feedback information by performing signal transmission through MIMO postamble. Accordingly, in the MIMO system according to one embodiment of the present invention, since the procedure of transmitting and receiving feedback information between the devices can be omitted, the MIMO system can be implemented more simply and the time required for communication can be reduced.

Figure 21:
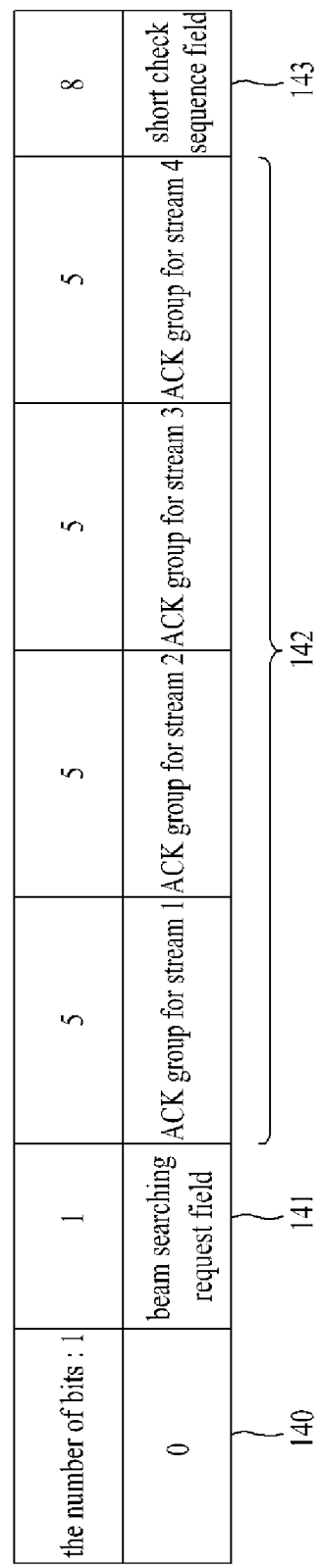
FIG. 21 is a diagram illustrating other example of a data format of an acknowledgement (ACK) signal transmitted from the SVD based SM MIMO receiving device according to one embodiment of the present invention.

In the mean time, the ACK/NACK signal transmitted from the receiving device to the transmitting device in the step S36 can be transmitted in the form of the data format illustrated in FIG. 21.

FIG. 21 is a diagram illustrating other example of a data format of an acknowledgement (ACK) signal transmitted from the SVD based SM MIMO receiving device according to one embodiment of the present invention.

In general, a directional spatial multiplexing ACK packet uses a directional low-rate physical data unit (LRPDU) that includes an omni-directional LRP payload field. Accordingly, if data are mainly transmitted through the HRP channel, the ACK signal is transmitted through, but not limited to, the LRP channel.

Referring to FIG. 21, the directional SM ACK packet includes a first field 140 for indicating payload on the LRPDU to which 1 bit is simply allocated, a beam searching request field 141 for requesting a beam searching process, an ACK group field 142 that includes a plurality of ACK groups that include ACK information on the data stream transmitted from the transmitting device, and a short check sequence (SCS) field 143 that includes a short check sequence.

If quality of the received signal is not good, the beam searching request field 141 includes information transmitted from the receiving device to the transmitting device to request a beam searching operation for signal transmission through a new beamforming antenna group. If 1 bit is allocated to the beam searching request field 141, a value of 1 is set to the beam searching request field 141 when the beam searching operation is requested. If not so, a value of 0 is set to the beam searching request field 141. The value may be changed, and may include more detailed information if more bits are allocated to the beam searching request field 141. In other words, the ACK signal can include feedback information on signal quality and channel estimation, which is received from the receiving device to the transmitting device in the SVD based SM MIMO system provided with the aforementioned adaptive antenna groups. In general, the feedback information may be transmitted to the corresponding device through the ACK signal.

The ACK group field 142 includes each group that includes ACK information on each data stream. 5 bits can be allocated to each group, and ACK information on four data streams can be included in one data format as illustrated in FIG. 21. However, the number of ACK groups included in one ACK data format is not limited to the example of FIG. 21. In the ACK group field 142 on the kth data stream, the nth bit can be set to 1 if the kth data stream is received without loss. Since 5 bits are allocated to each ACK group, the corresponding bit indicating data stream ACK information can be varied depending on the embodiment. On the other hand, when an error such as data loss occurs, all bits allocated the ACK group field on the kth data stream can be set to 0.

As described above, if the non-adaptive antenna group or split antenna group is used in the SVD based SM MIMO system, the number of subchannels used in the SVD based system can be reduced from K=min{M×n, N×n} to minimum two as described above, together with maximum SNR. Also, even though the procedure of transmitting and receiving feedback information between the WVAN devices, the SVD mode can be formed through the MIMO postamble.

Figure 22:
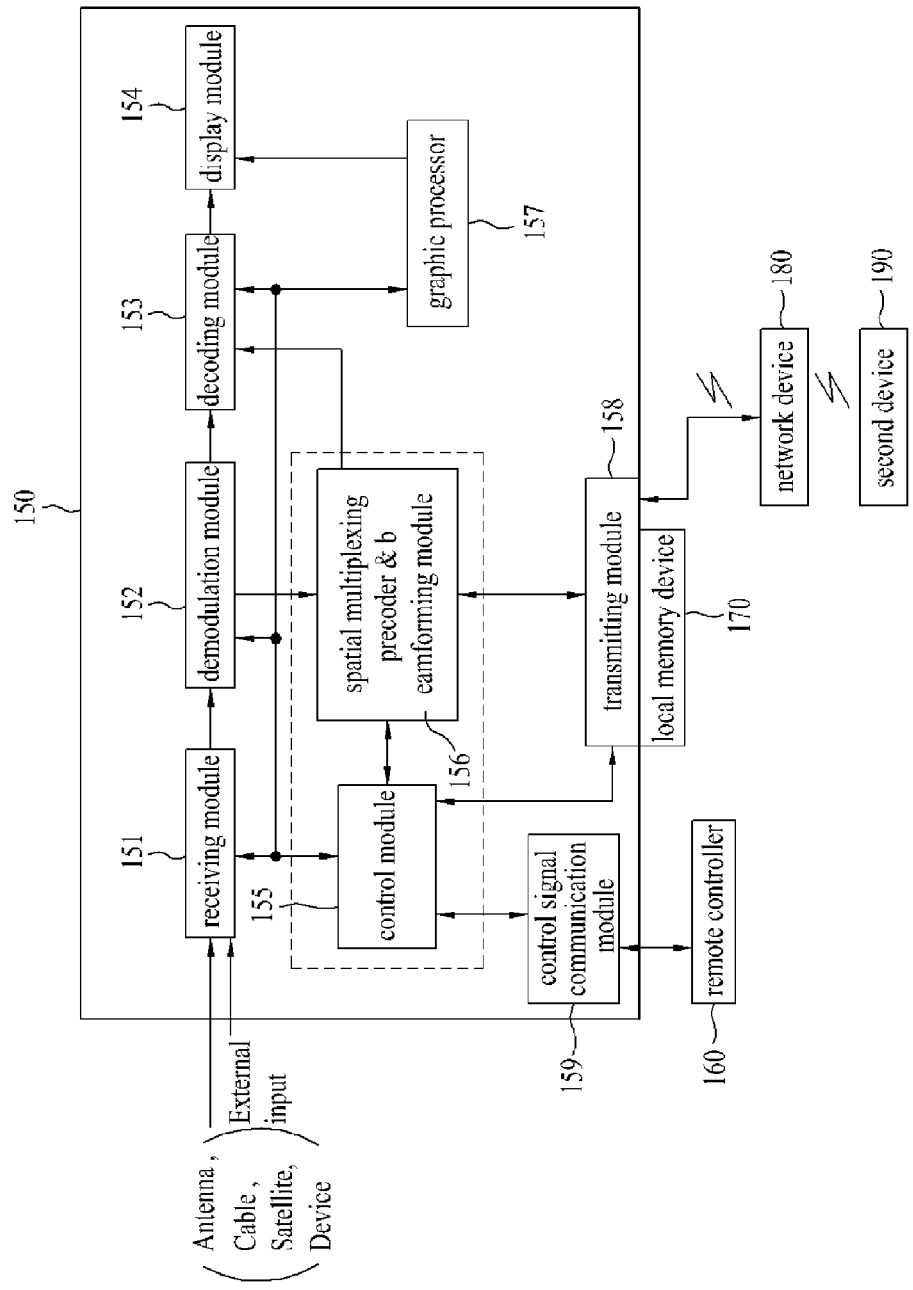
FIG. 22 is a diagram illustrating an example of a broadcasting signal processing system that includes an SVD based SM MIMO transmitting device according to another embodiment of the present invention.

Next, FIG. 22 is a diagram illustrating an example of a broadcasting signal processing system that includes an SVD based SM MIMO transmitting device according to another embodiment of the present invention.

In general, the WVAN device can play A/V data through processes which will be described layer, wherein the A/V data are input from at least one of a broadcasting station, cable, satellite, and other WVAN device through an antenna. If the WVAN device receives data from other device, it may be a receiving device. If the WVAN device transmits data to other device, it may be a transmitting device. Also, the WVAN device may perform message exchange with the coordinator.

The transmitting device according to one embodiment of the present invention includes a transmitter and a receiver, each of which includes one or more beamforming groups. Also, the transmitting device is an example of a spatial multiplexing (SM) MIMO device that performs SVD precoding.

Referring to FIG. 22, the broadcasting signal processing system according to the embodiment of the present invention includes a transmitting device 150, a remote controller 160, a local memory device 170, and a network device 180 for performing wireless communication with a receiving device 190.

The transmitting device 150 that transmits A/V data includes a receiving module 151, a demodulation module 152, a decoding module 153, a display module 154, a control module 155, a spatial multiplexing precoder & beamforming module 156, a graphic processor 157, a transmitting module 158, and a control signal communication module 159. In the example FIG. 22, the local memory device 170 is directly connected with the transmitting module 158 that includes input and output ports. However, the local memory device 170 may be a memory device mounted in the transmitting device 150.

The transmitting module 158 can communicate with the wire/wireless network device 180, and can be connected with at least one receiving device 190 through the network device 180, wherein the at least one receiving device 190 exists on the wireless network. The control signal communication module 159 receives a user control signal in accordance with a user control device, for example, a remote controller, and outputs the received signal to the control module 155.

The receiving module 151 could be a tuner that receives a broadcasting signal of a specific frequency through at least one of terrestrial, satellite, cable, and Internet network. The receiving module 151 may be provided respectively for each of broadcasting sources, for example, terrestrial broadcasting, cable broadcasting, satellite broadcasting, and personal broadcasting. Alternatively, the receiving module 151 may be a unified tuner. Also, supposing that the receiving module 151 is a tuner for terrestrial broadcasting, at least one digital tuner and at least one analog tuner may be provided respectively, or a digital/analog tuner may be provided.

Furthermore, the receiving module 151 may receive internet protocol (IP) streams transferred through wire and wireless communication. If the receiving module 151 receives IP streams, the receiving module 151 can process transmitting and receiving packets in accordance with an IP that establishes source and destination information for received IP packets and packets transmitted from the receiver. The receiving module 151 can output video/audio/data streams included in the received IP packets in accordance with the IP, and can generate transport streams to be transmitted to the network as IP packets in accordance with the IP so as to output them. The receiving module 151 is an element that receives an externally input video signal, and, for example, may receive IEEE 1394 type video/audio signals or HDMI type streams from the outside.

The demodulation module 152 demodulates broadcasting signals among data input through the receiving module 151 or broadcasting signals transmitted from the receiving device in an inverse order of a modulation mode. The demodulation module 152 outputs broadcasting streams by demodulating the broadcasting signals. If the receiving module 151 receives stream type signals, for example, IP streams, the IP streams are output to the decoding module 153 after bypassing the demodulation module 152.

The decoding module 153 includes an audio decoder and a video decoder, and decodes the broadcasting streams output from the demodulation module 152 through a decoding algorithm and outputs the decoded streams to the display module 154. At this time, a demultiplexer (not shown) that splits each stream in accordance with a corresponding identifier may additionally be provided between the demodulation module 152 and the decoding module 153. The demultiplexer splits the broadcasting signals into an audio element stream (ES) and a video element stream and outputs them to each decoder of the decoding module 153. Also, if a plurality of programs are multiplexed in one channel, the demultiplexer selects only a broadcasting signal of a program selected by a user and splits the selected broadcasting signal into a video element stream and an audio element stream. If data streams or system information streams are included in the demodulated broadcasting signals, they are split by the demultiplexer and then transferred to a corresponding decoding block (not shown).

The display module 154 displays broadcasting contents received from the receiving module 151 and contents stored in the local memory device 170. The display module 154 can display a menu indicating whether the memory device has been mounted in the transmitting device and information related to the remaining capacity of the memory device, in accordance with a control command of the control module 155, and can be operated under the control of the user.

The control module 155 can control the operations of the aforementioned modules (receiving module, demodulation module, decoding module, display module, graphic processor, spatial multiplexing precoder & beamforming module, and interface module). Also, the control module 155 displays a menu that receives a control command of the user, and drives an application that displays various kinds of information or menu of the broadcasting signal processing system for the user.

For example, the control module 155 can read out the contents stored in the local memory device 170 if the local memory device 170 is mounted in the transmitting device. Also, the control module 155 can control the operation of the local memory device 170 so that the broadcasting contents received from the receiving module 151 are stored in the local memory device 170 if the local memory device 170 is mounted in the transmitting device. Furthermore, the control module 155 can output a control signal for mounting the local memory device 170 depending on whether the local memory device 170 has been mounted in the transmitting device.

The control module 155 checks remaining memory capacity of the local memory device 170, and allows information of the remaining memory capacity to be displayed for the user on the display module 154 through the graphic processor 157. The control module 155 can shift the contents stored in the local memory device 170 to the remote memory device if the remaining memory capacity of the local memory device 170 is not sufficient. In this case, the control module 155 can display a menu indicating whether to shift the contents stored in the local memory device 170 to another local memory device (not shown) or the remote memory device through the display module 154. And, the control module 155 can receive and process a user control signal of the menu. Accordingly, the control module 155 can allow the contents stored in the local memory device 170 and other directly or remotely mounted memory device to be shifted between them and stored therein.

The spatial multiplexing precoder & beamforming module 156 that is the second control module may directly receive the broadcasting signals from the receiving module 151, or may receive the broadcasting signals demodulated by the demodulation module 152. In case of the former case, an encoding process may be omitted. Also, the broadcasting signals received by the receiving module 151 can be input to the second control module 156 after going through a processing procedure for signal transmission in the control module 155.

For example, if a message including the broadcasting signals is received from the external device 160, the received message is split into a broadcasting signal and MAC message by the network control module 125. The split broadcasting signal (or broadcasting stream) is input to the decoding module 123, decoded by a decoding algorithm, and output to the display module 124. The second control module 156 includes a spatial multiplexing precoder that performs precoding for the data streams to be transmitted through the transmitting module 159, depending on that the transmitting device 150 is the SM MIMO device. The spatial multiplexing precoder performs precoding for the data streams described with reference to FIG. 9. In this case, the spatial multiplexing precoder performs SVD based precoding. In the mean time, although the data transmitted from the demodulation module 152 are not illustrated in FIG. 22, the second control module 156 may include an SVD spatial encoder that performs encoding for data to be transmitted to the second control module 156 to form orthogonal subchannels through a channel. The SVD spatial encoder may be included in the control module 155.

Also, the second control module 156 includes a beamforming module that controls the transmitting device 150 provided with a plurality of antennas to perform a beam searching process based on beamforming. Beam searching is performed to transmit a training signal, which includes at least one training sequence, to the receiving device, determine a desired antenna group based on feedback information on the training signal, which is received from the receiving device, and determine a weight value of a plurality of antenna groups.

The SM MIMO transmitting device according to one embodiment of the present invention can transmit and receive a signal for obtaining an optimized precoding matrix while performing precoding for spatial multiplexing. In other words, the transmitting device 150 includes a transmitting and receiving module that transmits a training signal, which includes at least one training sequence, to the receiving device 190 and receives feedback information for precoding determined using the training sequence from the receiving device 190. Although the transmitting and receiving module is not illustrated in FIG. 22, it may be included in the control module 155 or the second control module 156, or may be provided separately. If the feedback information is received through the receiving module 151, the transmitting device 150 determines an optimized antenna group and a precoding matrix based on the feedback information. At this time, the antenna group and precoding matrix may be determined by the second control module 156, or the control module 155 may transmit information on the determined antenna group and precoding matrix to the second control module 156 to perform precoding.

In addition, the control mode performed by the second control module 156 may be performed by the control module 155. Although the control module 155 and the second control module 156 are provided separately in FIG. 22 for convenience of description, they may be implemented by a single system chip as shown in a portion marked with a dotted line.

The graphic processor 157 processes a graphic to be displayed so that a menu screen is displayed in a video image displayed by the display module 154, and controls the graphic to be displayed in the display module 154 together with the menu screen.

The transmitting module 158 can be used to transmit the data streams generated by the control module 155 or the second control module 156 to the receiving device 190 through the wire and wireless network. Alternatively, the transmitting module 158 can be used if the transmitting device 150 transmits data to other device.

Also, the transmitting module 158 can include an interface module that performs bidirectional communication between the devices belonging to the WVAN. The interface module can interface with at least one receiving device 190 through the wire and wireless network. Examples of the interface module include Ethernet module, Bluetooth module, short distance wireless Internet module, portable Internet module, home PNA module, IEEE1394 module, PLC module, home RF module, and IrDA module.

The transmitting device described above includes modules, although not illustrated in FIG. 22, mentioned with reference to FIG. 9.

The MIMO system according to the embodiment of the present invention can be used effectively for mmWave having strong directionality.

The terms herein can be replaced with other terms. For example, "device" can be replaced with user device (or machine), station, etc., and "coordinator" can be replaced with coordinating (control) device, coordinating (or control) station, piconet coordinator (PNC), etc. Also, the WVAN parameter configuring the WVAN can be used to refer to network configuration information.

It will be apparent that some claims referring to specific claims may be combined with another claims referring to the other claims other than the specific claims to constitute the embodiment or add new claims by means of amendment after the application is filed.

It will be apparent to those skilled in the art that the terms herein can be replaced with other terms, for example, "device" can be replaced with user device (or machine), station, etc., and "coordinator" can be replaced with coordinating (control) device, coordinating (or control) station, piconet coordinator (PNC), etc. Also, data packets may mean transmitted and received information such as messages, traffic, video/audio data packets, control data packets, and are not limited to specific data packets.

Examples of the devices that can perform communication in the communication system include computers, PDAs, notebook computers, digital TVs, camcorders, digital cameras, printers, mikes, speakers, headsets, bar-code readers, displays, and cellular phones. All digital devices can be used as the devices.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The embodiments of the present invention can be applied to various wireless communication systems. Examples of various wireless communication systems include 3GPP (3rd Generation Partnership Project) system, 3GPP2 system and/or IEEE 802.xx (Institute of Electrical and Electronic Engineers 802) system. The embodiments of the present invention can be applied to Bluetooth, which can transmit and receive audio or video data between the devices that form the wireless network, and the WPAN technology. The embodiments of the present invention can also be applied to all technical fields to which the various access systems are applied, as well as the various access systems.

What is claimed is:

1. A method for performing spatial multiplexing (SM) precoding in a wireless access system supporting a wireless video area network (WVAN), the method performed by a transmitting device including a plurality of antennas and comprising:

performing a SM high-rate physical (HRP) beam searching process for selecting at least one optimized beamforming antenna group with a receiving device that includes a plurality of antennas;

transmitting a first packet comprising at least one spatial multiplexing training sequence that is used to calculate a spatial precoding matrix to the receiving device, if channel matrix rank is estimated greater than one after performing the SM HRP beam searching process;

receiving a second packet comprising feedback information for the spatial precoding matrix from the receiving device, wherein the spatial precoding matrix that is calculated by using the at least one spatial multiplexing training sequence; and performing spatial multiplexing precoding for data streams to be transmitted to the receiving device, by using the spatial precoding matrix, wherein the first packet is transmitted in accordance with a HRP mode and the second packet is received in accordance with a low-rate physical (LRP) mode, wherein the WVAN supports a HRP layer for the HRP mode and a LRP layer for the LRP mode, and wherein during the SM HRP beam searching process, the transmitting device iteratively transmits a first training sequence, receives feedback information for the first training sequence for a number of times equal to a predetermined value and applying an antenna array weight vector (AWV) to the at least one optimized beamforming antenna group based on the feedback information for the first training sequence.

2. The method according to claim 1, wherein a number of feedback bits of the second packet is determined based on a number of spatial multiplexing ports and a maximum number of antennas per the spatial multiplexing ports.

3. The method according to claim 1, wherein the feedback information for the spatial precoding matrix is related to precoding angles for obtaining the spatial precoding matrix.

4. The method according to claim 3, wherein a number and an order of the precoding angles of the spatial precoding matrix are determined depending on a number of data streams and a number of spatial multiplexing ports.

5. A transmitting device for transmitting data to a receiving device by using a plurality of antennas in a wireless access system supporting a wireless video area network (WVAN), the transmitting device comprising:
a transmitter configured to control the plurality of antennas;
a receiver; and
a control module,
wherein the control module is configured to:
perform a spatial multiplexing (SM) high-rate physical (HRP) beam searching process for selecting at least one optimized beamforming antenna with the receiving device that includes a plurality of antennas by controlling the transmitter and the receiver;
transmit, by controlling the transmitter, a first packet comprising at least one spatial multiplexing training sequence that is used to calculate a spatial precoding matrix to the receiving device, if channel matrix rank is estimated greater than one after performing the SM HRP beam searching process;
receive, by controlling the receiver, a second packet comprising feedback information for the spatial precoding matrix from the receiving device, wherein the spatial precoding matrix is calculated by using the at least one spatial multiplexing training sequence; and
perform spatial multiplexing precoding for data streams to be transmitted to the receiving device, by using the spatial precoding matrix,
wherein the first packet is transmitted in accordance with a HRP mode and the second packet is received in accordance with a low-rate physical (LRP) mode,
wherein the WVAN supports a HRP layer for the HRP mode and a LRP layer for the LRP mode, and
wherein during the SM HRP beam searching process, the transmitting device iteratively transmits a first training sequence, receives feedback information for the first training sequence for a number of times equal to a predetermined value and applies an antenna array weight vector (AWV) to the at least one optimized beamforming antenna group based on the feedback information for the first training sequence.

6. The transmitting device according to claim 5, wherein a number of feedback bits of the second packet is determined based on a number of spatial multiplexing ports and a maximum number of antennas per the spatial multiplexing ports.

7. The transmitting device according to claim 5, wherein the feedback information for the spatial precoding matrix is related to precoding angles for obtaining the spatial precoding matrix.

8. The transmitting device according to claim 7, wherein a number and an order of the precoding angles of the spatial precoding matrix are determined depending on a number of data streams and a number of spatial multiplexing ports.

9. A method for transmitting feedback information for spatial multiplexing (SM) precoding from a receiving device that includes a plurality of antennas in a wireless access system supporting a wireless video area network (WVAN), the method comprising:
performing a SM high-rate physical (HRP) beam searching process for selecting at least one optimized beamforming antenna with a transmitting device that includes a plurality of antennas;
receiving a first packet comprising at least one spatial multiplexing training sequence that is used to calculated a spatial precoding matrix from the transmitting device, if channel matrix rank is estimated greater than one after performing the SM HRP beam searching process;
determining feedback information for the spatial precoding matrix in the receiving device by using the at least one spatial multiplexing training sequence;
transmitting a second packet comprising the feedback information to the transmitting device; and
receiving data subjected to the spatial multiplexing precoding by using the spatial precoding matrix,
wherein the first packet is transmitted in accordance with a HRP mode and the second packet is received in accordance with a low-rate physical (LRP) mode~
wherein the WVAN supports a HRP layer for the HRP mode and a LRP layer for the LRP mode,
wherein during the SM HRP beam searching process, the receiving device iteratively receives a first training sequence, transmits feedback information for the first training sequence for a number of times equal to a predetermined value, and
wherein an antenna array weight vector (AWV) is applied to the at least one optimized beamforming antenna group based on the feedback information for the first training sequence.

10. The method according to claim 9, wherein a number of feedback bits of the second packet is determined based on a number of spatial multiplexing ports and a maximum number of antennas per the spatial multiplexing ports.

11. The method according to claim 9, wherein the feedback information for the spatial precoding matrix is related to precoding angles for obtaining the spatial precoding matrix.

12. The method according to claim 11, wherein a number and an order of the precoding angles of the spatial precoding matrix are determined depending on a number of data streams and a number of spatial multiplexing ports.

13. A receiving device for transmitting feedback information for spatial multiplexing (SM) precoding to a transmitting device by using a plurality of antennas in a wireless access system supporting a wireless video area network (WVAN), the receiving device comprising:
a transmitter configured to control the plurality of antennas;
a transmitter,
a receiver; and a controller;
wherein the controller is configured to:
perform a SM high-rate physical (HRP) beam searching process for selecting at least one optimized beamforming antenna with a transmitting device that includes a plurality of antennas by controlling the transmitter and the receiver;
receive, by controlling the receiver, a first packet comprising at least one spatial multiplexing training sequence that is used to calculated a spatial matrix from the transmitting device, if channel matrix rank is estimated greater than one after performing the SM HRP beam searching process;
determine feedback information for the spatial precoding matrix in the apparatus by using the at least one spatial multiplexing training sequence;
transmit, by controlling the transmitter, a second packet comprising the feedback information to the transmitting device; and
receive, by controlling the receiver, data subjected to the spatial multiplexing precoding by using the spatial precoding matrix,
wherein the first packet is transmitted in accordance with a HRP mode and the second packet is received in accordance with a LRP mode
wherein the WVAN supports a HRP layer for the HRP mode and a LRP layer for the LRP mode, wherein during the SM HRP beam searching process, the receiving device iteratively receives a first training sequence, transmit feedback information for the first training sequence for a number of times equal to a predetermined value, and wherein an antenna array weight vector (AWV) is applied to the at least one optimized beamforming antenna group based on the feedback information for the first training sequence.

14. The receiving device according to claim 13, wherein a number of feedback bits of the second packet is determined based on a number of spatial multiplexing ports and a maximum number of antennas per the spatial multiplexing ports.

15. The transmitting device according to claim 13, wherein the feedback information for the spatial precoding matrix is related to precoding angles for obtaining the spatial precoding matrix.

16. The receiving device according to claim 15, wherein a number and an order of the precoding angles of the spatial precoding matrix are determined depending on a number of data streams and a number of spatial multiplexing ports.

* * * * *